US008468353B2

(12) United States Patent
Wei et al.

(10) Patent No.: US 8,468,353 B2
(45) Date of Patent: *Jun. 18, 2013

(54) METHOD, SYSTEM AND AUTHENTICATION CENTRE FOR AUTHENTICATING IN END-TO-END COMMUNICATIONS BASED ON A MOBILE NETWORK

(75) Inventors: Jiwei Wei, Santa Clara, CA (US); Xuyan Fan, Shenzhen (CN); Chao Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/160,152

(22) Filed: Jun. 14, 2011

(65) Prior Publication Data

US 2011/0258447 A1    Oct. 20, 2011

Related U.S. Application Data

(63) Continuation of application No. 11/848,092, filed on Aug. 30, 2007, now Pat. No. 7,984,298, which is a continuation of application No. PCT/CN2006/003601, filed on Dec. 26, 2006.

(30) Foreign Application Priority Data

| Jan. 24, 2006 | (CN) | 2006 1 0033377 |
| Apr. 4, 2006 | (CN) | 2006 1 0074902 |
| Apr. 20, 2006 | (CN) | 2006 1 0079252 |

(51) Int. Cl.
    *H04L 29/06* (2006.01)

(52) U.S. Cl.
    USPC .......... 713/171; 380/272; 380/273; 380/44

(58) Field of Classification Search
    USPC .................. 713/168; 380/272, 273, 44
    See application file for complete search history.

(56) References Cited

U.S. PATENT DOCUMENTS

| 6,745,326 | B1 * | 6/2004 | Wary | 713/168 |
| 7,188,360 | B2 * | 3/2007 | Gerdes et al. | 726/4 |

(Continued)

FOREIGN PATENT DOCUMENTS

| CN | 1320344 A | 10/2001 |
| CN | 13020344 A | 10/2001 |

(Continued)

OTHER PUBLICATIONS

1st Information Disclose Statement in corresponding U.S. Appl. No. 11/848,092 (Aug. 30, 2007).

(Continued)

*Primary Examiner* — David García Cervetti
(74) *Attorney, Agent, or Firm* — Leydig, Voit & Mayer, Ltd.

(57) ABSTRACT

The invention discloses a method for authenticating in end-to-end communications based on a mobile network, applied to a system including a first service entity requesting a service, a second service entity providing the service and an entity authentication center, EAC; respectively performing a mutual authentication between the first service entity and the EAC and that between the second service entity and the EAC according to the negotiated authentication mode; if the first service entity requests the second service entity to provide the service, the EAC providing authentication inquiring for the first service entity and the second service entity according to the negotiated authentication mode, and generating a shared derived key according to the negotiated authentication mode; and the first service entity and the second service entity authenticating each other according to the shared derived key and the negotiated authentication mode, and generating a session key for protecting the service.

4 Claims, 14 Drawing Sheets

U.S. PATENT DOCUMENTS

| | | | | |
|---|---|---|---|---|
| 7,296,147 B2* | 11/2007 | Matsuzaki et al. | | 713/155 |
| 7,373,508 B1* | 5/2008 | Meier et al. | | 713/168 |
| 7,428,637 B1* | 9/2008 | Billman et al. | | 713/168 |
| 7,450,554 B2* | 11/2008 | Zhang | | 370/338 |
| 7,681,033 B2* | 3/2010 | Miura et al. | | 713/155 |
| 7,720,910 B2* | 5/2010 | Goodman et al. | | 709/206 |
| 7,760,882 B2* | 7/2010 | Tidwell et al. | | 380/270 |
| 7,793,103 B2* | 9/2010 | Fu et al. | | 713/171 |
| 7,797,532 B2* | 9/2010 | Miura et al. | | 713/156 |
| 7,818,792 B2* | 10/2010 | Shamsaasef et al. | | 726/10 |
| 7,984,298 B2 | 7/2011 | Wei et al. | | |
| 2002/0147820 A1 | 10/2002 | Yokote | | |
| 2003/0046541 A1* | 3/2003 | Gerdes et al. | | 713/168 |
| 2003/0115341 A1* | 6/2003 | Sinha et al. | | 709/229 |
| 2004/0019645 A1* | 1/2004 | Goodman et al. | | 709/206 |
| 2004/0034776 A1* | 2/2004 | Fernando et al. | | 713/171 |
| 2004/0122906 A1* | 6/2004 | Goodman et al. | | 709/206 |
| 2005/0147249 A1* | 7/2005 | Gustavsson et al. | | 380/247 |
| 2005/0210252 A1* | 9/2005 | Freeman et al. | | 713/171 |
| 2005/0223228 A1 | 10/2005 | Ogawa et al. | | |
| 2005/0267896 A1* | 12/2005 | Goodman et al. | | 707/10 |
| 2005/0273499 A1* | 12/2005 | Goodman et al. | | 709/206 |
| 2006/0020783 A1* | 1/2006 | Fisher | | 713/156 |
| 2006/0021017 A1* | 1/2006 | Hinton et al. | | 726/10 |
| 2006/0021018 A1* | 1/2006 | Hinton et al. | | 726/10 |
| 2006/0036679 A1* | 2/2006 | Goodman et al. | | 709/203 |
| 2006/0053296 A1* | 3/2006 | Busboom et al. | | 713/182 |
| 2006/0059344 A1* | 3/2006 | Mononen | | 713/171 |
| 2006/0064588 A1* | 3/2006 | Tidwell et al. | | 713/169 |
| 2006/0104234 A1* | 5/2006 | Zhang | | 370/328 |
| 2006/0117175 A1* | 6/2006 | Miura et al. | | 713/155 |
| 2006/0135125 A1* | 6/2006 | Laitinen | | 455/411 |
| 2006/0143453 A1* | 6/2006 | Imamoto et al. | | 713/169 |
| 2006/0164919 A1 | 7/2006 | Watanabe | | |
| 2006/0174332 A1* | 8/2006 | Bauban et al. | | 726/5 |
| 2006/0218628 A1* | 9/2006 | Hinton et al. | | 726/8 |
| 2006/0236382 A1* | 10/2006 | Hinton et al. | | 726/8 |
| 2006/0248337 A1* | 11/2006 | Koodli | | 713/171 |
| 2006/0251257 A1* | 11/2006 | Haverinen et al. | | 380/270 |
| 2006/0265339 A1* | 11/2006 | Vakil et al. | | 705/74 |
| 2006/0271785 A1* | 11/2006 | Holtmanns et al. | | 713/171 |
| 2006/0281442 A1* | 12/2006 | Lee et al. | | 455/412.2 |
| 2006/0291661 A1* | 12/2006 | Ramzan et al. | | 380/277 |
| 2007/0042754 A1* | 2/2007 | Bajikar et al. | | 455/411 |
| 2007/0083796 A1* | 4/2007 | Miura et al. | | 713/155 |
| 2007/0118875 A1* | 5/2007 | Chow et al. | | 726/2 |
| 2007/0121947 A1* | 5/2007 | Sood et al. | | 380/277 |
| 2007/0157022 A1* | 7/2007 | Blom et al. | | 713/166 |
| 2007/0198837 A1* | 8/2007 | Koodli et al. | | 713/171 |
| 2007/0204160 A1* | 8/2007 | Chan et al. | | 713/171 |
| 2007/0210894 A1* | 9/2007 | Park et al. | | 340/5.2 |
| 2007/0211892 A1 | 9/2007 | Ohkoshi | | |
| 2007/0260884 A1* | 11/2007 | Venkitaraman et al. | | 713/169 |
| 2007/0297611 A1* | 12/2007 | Yun et al. | | 380/270 |
| 2008/0063205 A1* | 3/2008 | Braskich et al. | | 380/270 |
| 2008/0254833 A1* | 10/2008 | Keevill et al. | | 455/558 |
| 2009/0013381 A1* | 1/2009 | Torvinen et al. | | 726/3 |
| 2009/0044007 A1* | 2/2009 | Ferrazzini et al. | | 713/155 |
| 2009/0287922 A1* | 11/2009 | Herwono et al. | | 713/155 |
| 2010/0161958 A1* | 6/2010 | Cho et al. | | 713/151 |

FOREIGN PATENT DOCUMENTS

| | | | |
|---|---|---|---|
| CN | 1523808 | A | 8/2004 |
| CN | 1614903 | A | 5/2005 |
| CN | 1722658 | A | 1/2006 |
| EP | 1 343 342 | A1 | 9/2003 |
| FR | 2858732 | A1 | 2/2005 |
| JP | 2003-51818 | A | 2/2003 |
| JP | 2004-517517 | A | 6/2004 |
| JP | 2005-25739 | A | 1/2005 |
| JP | 2005-505991 | A | 2/2005 |
| JP | 2005/295038 | A | 10/2005 |
| WO | WO 01/13666 | A1 | 2/2001 |
| WO | WO 2005/067199 | A1 | 7/2005 |
| WO | WO 2005/101787 | A1 | 10/2005 |
| WO | WO 2007/079698 | A1 | 7/2007 |
| WO | WO 2007/085175 | A1 | 8/2007 |

OTHER PUBLICATIONS

2nd Information Disclose Statement in corresponding U.S. Appl. No. 11/848,092 (Oct. 20, 2010).

1st Office Action in corresponding U.S. Appl. No. 11/848,092 (Sep. 30, 2010).

U.S. Appl. No. 11/848,092.

Extended European Search Report in counterpart European Application No. 07001329.7-2412, mailed Jun. 27, 2007.

1st Office Action in corresponding Chinese Application No. 200680011730.5 (Jan. 22, 2010).

1st Office Action in corresponding Chinese Application No. 200610033377.2 (Nov. 28, 2008).

2nd Office Action in corresponding Chinese Application No. 200610033377.2 (Oct. 23, 2009).

Rejection Decision in corresponding Chinese Application No. 200610033377.2 (Mar. 10, 2010).

1st Office Action in corresponding Korean Application No. KR20087020544 (May 26, 2010).

Rejection Decision in corresponding Japanese Application No. 2008-551629 (Jun. 28, 2011).

Written Opinion in corresponding PCT Application No. PCT/CN2006/003601 (Apr. 5, 2007).

"3rd Generation Partnership Project; Technical Specification Group Services and System Aspects; Generic Authentication Architecture (GAA); Generic bootstrapping architecture (Release 7)," *3GPP*, 3GPP TS 33.220 V7.2.0 (Dec. 2005).

"3rd Generation Partnership Project 2 "3GPP2"—Generic Bootstrapping Architecture (GBA) Framework," *3GPP*, 3GPP2 S.S0109-0, Version 1.0, Version Date: Mar. 30, 2006.

"X.1124—Authentication architecture for mobile end-to-end communication," Series X: Data Networks, Open System Communications and Secureity Telecommunication Security, Nov. 2007, International Telecommunication Union, Geneva, Switzerland.

Decision of Rejection in corresponding Japanese Patent Application No. 2008-551629 (May 8, 2012).

* cited by examiner

METHOD, SYSTEM AND AUTHENTICATION CENTRE FOR AUTHENTICATING IN END-TO-END COMMUNICATIONS BASED ON A MOBILE NETWORK

CROSS-REFERENCE TO RELATED APPLICATIONS

This application is a continuation of U.S. patent application Ser. No. 11/848,092 which has been issued as U.S. Pat. No. 7,984,298, filed on Aug. 30, 2007, which is a continuation of International Application No. PCT/CN2006/003601, filed on Dec. 26, 2006. The International Application claims priority to Chinese Patent Application No. 200610033377.2, filed on Jan. 24, 2006, Chinese Patent Application No. 200610074902.5, filed on Apr. 4, 2006 and Chinese Patent Application No. 200610079252.3, filed on Apr. 20, 2006. The aforementioned patent applications are hereby incorporated by reference in their entireties.

FIELD OF THE INVENTION

The present relates to network communication service techniques, and more particularly, to a method, a system and an authentication centre for authenticating in end-to-end communications based on a mobile network.

BACKGROUND OF THE INVENTION

At present, when providing a service to a mobile subscriber, a majority of application servers first establish with the mobile subscriber a mutual trust relationship, such as that between the mobile subscriber and an authentication proxy, that between the mobile subscriber and a Public Key Infrastructure (PKI) certificate organization, that between the mobile subscriber and the content providing server, and the like. Generally, such trust relationship is established during the bidirectional authentication procedure between the mobile subscriber and the application server.

In the 3G radio communication standards, GenericGeneralGENERIC G Authentication Architecture (GAA) is a general architecture used by various application service entities to verify subscriber identities and can check application service subscribers and verify the subscriber identities. The above application service can be a multicast/broadcast service, a user certificate service, a service for providing instant information, or a proxy service.

FIG. 1 is a schematic diagram illustrating the architecture of the GAA which generally includes a subscriber 101, a Bootstrapping Server Function (BSF) 102 performing initial check and verification of subscriber identities, a Home Subscriber Server (HSS) 103 and a Network Application Function (NAF) 104. BSF 102 serves to perform mutual identity verification with subscriber 101 and generate a shared key for BSF 102 and subscriber 101. HSS 103 stores a Profile for describing subscriber information and has the function of generating authentication information.

When desiring to use a service, the subscriber communicates with the BSF directly for mutual authentication if the service needs a mutual authentication procedure with the BSF. Otherwise, the subscriber first contacts a NAF corresponding to the service, and if the NAF uses the GAA and the subscriber requesting the service has not communicated with the BSF for the mutual authentication procedure, the NAF notifies the subscriber requesting the service to perform the identity verification with the BSF.

Upon successful mutual authentication, the subscriber and the BSF authenticate each other's identity and generate a shared key, Ks. Further, the BSF defines a lifetime for the Ks to facilitate its update. Later, the BSF allocates a Bootstrapping Transaction Identifier (B-TID) for the subscriber and transfer the B-TID with the lifetime for the Ks to the user equipment (UE), wherein the B-TID is associated with the Ks. The shared key, Ks, which is used as a root key, will not leave the subscriber's UE and BSF. When the subscriber communicates with the NAF, a key derived from the Ks, Ks_NAF, is used to protect the communication.

The disadvantages of the GAA are: 1. only one authentication mechanism (i.e., the AKA authentication mechanism) being supported in the authentication between the subscriber and the BSF; 2. the authentication mechanism not providing the authentication between the BSF and NAF, which may result in stealing of secret information of the subscriber by attackers counterfeiting the NAF.

In 3GPP2, there is also a GAA, referring to FIG. 2. FIG. 2 is a diagram illustrating a GAA in the existing 3GPP2. The GAA in 3GPP2 includes a Mobile Node (MN) 201, a Network Application Function (NAF) 202, a BSF 203 for performing initial check and verification of subscriber identities, an HSS 204, a Home Location Register/Authentication Centre (HLR/AC), and an Authentication Authorization Accounting (AAA) server.

If desiring to use the service provided by the NAF, the MN first has to perform the mutual authentication with the BSF. There are three types of mutual authentication mechanisms (including an AKA authentication mechanism, a CAVE-based authentication mechanism and an AAA-based authentication mechanism) which can be chosen freely according to the support condition of the MN and network and the operator's local policy.

However, the GAA in 3GPP2 only supports three authentication mechanisms, which is not applicable for the mutual authentication between one service entity and various networks. Furthermore, the authentication mechanism does not provide the authentication between the BSF and the NAF, which may result in stealing of secret information of the subscriber by attackers counterfeiting the NAF.

To sum up, the existing GAAs are just applicable within the standard they belong to and are restricted by the networks and the service entities, and thus have some limitations.

SUMMARY OF THE INVENTION

The embodiments according to the present invention provide generic authentication architecture applicable for different mobile network standards so as to establish a mutual trust relationship between various entities.

The technical solutions in accordance with the embodiments of the present invention are as follows:

The embodiments of the invention disclose a method for authenticating in end-to-end communications based on a mobile network, applied to a system including a first service entity requesting a service, a second service entity providing the service and an entity authentication centre, EAC, including:

negotiating an authentication mode between the first service entity and the EAC, wherein the negotiated authentication mode includes: an authentication mechanism between the first service entity and the EAC, an authentication mechanism between the second service entity and the EAC, a mechanism of authentication inquiring, a mechanism for generating a derived key, and an authentication mechanism between the first service entity and the second service entity;

performing a mutual authentication between the EAC and the first service entity according to the authentication mechanism between the first service entity and the EAC included in the negotiated authentication mode, and performing a mutual authentication between the EAC and the second service entity according to the authentication mechanism between the second service entity and the EAC included in the negotiated authentication mode;

if the first service entity requests the second service entity to provide the service, the EAC providing authentication inquiring for the first service entity and the second service entity according to the mechanism of authentication inquiring included in the negotiated authentication mode, and generating a shared derived key for protecting the communication between the first service entity and the second service entity according to the mechanism for generating a derived key included in the negotiated authentication mode; and the first service entity and the second service entity authenticating each other according to the shared derived key and the authentication mechanism between the first service entity and the second service entity included in the negotiated authentication mode, and generating a session key for protecting the service.

The embodiments of the invention also disclose a method for authenticating service entities, applied to a service entity and an EAC, including:

negotiating an authentication mode between the service entity and the EAC, wherein the negotiated authentication mode includes an authentication mechanism between the service entity and the EAC; and performing a mutual authentication between the service entity and the EAC according to the authentication mechanism included in the negotiated authentication mode.

The embodiments of the invention disclose a method of authentication inquiring, applied to a system including a first service entity requesting a service, a second service entity providing the service and an EAC, wherein, a mutual authentication between the first service entity and the EAC and that between the second service entity and the EAC are respectively performed, the EAC allocates temporary identities respectively for the first service entity and the second service entity and acquires the shared key materials respectively for protecting the communications with the first service entity and the second service entity, and with the EAC, the first service entity negotiates an authentication mode including a mechanism of authentication inquiring and a mechanism for generating a derived key; the method including:

if the first service entity requests the service provided by the second service entity, authenticating authorities of the first service entity and the second service entity according to the temporary identities of the first service entity and the second service entity according to the mechanism of authentication inquiring included in the negotiated authentication mode; and calculating a shared derived key for protecting the communication between the first service entity and the second service entity according to the mechanism for generating the derived key included in the negotiated authentication mode, the temporary identities of the first service entity and the second service entity, and the shared key material for protecting the communication with the first service entity.

The embodiments of the invention disclose a system for authenticating in end-to-end communications based on a mobile network, including a first service entity requesting a service, a second service entity providing a service and an EAC, wherein, the first service entity is configured to negotiate with the EAC an authentication mode including at least one mechanism related with authentication, to perform a mutual authentication between the first service entity and the EAC according to the negotiated authentication mode, to request a service from the second service entity, and to perform a mutual authentication between the first service entity and the second service entity according to the shared derived key for protecting the communication between the first service entity and the second service entity according to the negotiated authentication mode;

the second service entity is configured to authenticate the EAC according to the negotiated authentication mode, and to perform the mutual authentication between the second service entity and the first service entity according to the shared derived key for protecting the communication between the first service entity and the second service entity according to the negotiated authentication mode if the first service entity requests the service; and the EAC is configured to respectively perform the mutual authentication between the EAC and the first service entity and that between EAC and the second service entity according to the negotiated authentication mode, and when the first service requests the service, to provide an authentication inquiring for the first service entity and the second service entity according to the negotiated authentication mode and to generate the shared derived key for protecting the communication between the first service entity and the second service entity.

The embodiments of the invention also disclose a system for authenticating service entities, including a service entity and an EAC, wherein, the service entity is configured to negotiate with the EAC an authentication mode which includes an authentication mechanism between the service entity and the EAC, and to perform a mutual authentication between the service entity and the EAC according to the authentication mechanism included in the negotiated authentication mode.

The embodiments of the invention further disclose a system of authentication inquiring, including a first service entity requesting a service, a second service entity providing the service and an EAC, wherein, the first service entity is configured to negotiate with the EAC an authentication mode which includes a mechanism of authentication inquiring and a mechanism for generating a derived key; and the EAC is configured to, when the first service entity requests the service, authenticate the authorities of the first service entity and the second service entity according to the mechanism of authentication inquiring included in the negotiated authentication mode, and to generate a shared derived key for protecting the communication between the first service entity and the second service entity according to the mechanism for generating the derived key included in the negotiated authentication mode.

The embodiments of the invention disclose an authentication centre, including:

a first module, configured to negotiate an authentication mode of a service entity, wherein the authentication mode includes an authentication mechanism between the service entity and the authentication centre; and a second module, configured to authenticate the service entity according to the authentication mechanism included in the authentication mode negotiated by the first module.

In the above authentication centre, the first module includes: a first sub-module, configured to inquire subscription data to respectively acquire authentication capabilities of the service entity requesting a service and the service entity providing the service; and a second sub-module, configured to select an authentication mode according to the authentication capabilities of the service entity requesting the service and the service entity providing the service, the authentication capabilities being acquired by the first module.

In the above authentication centre, the authentication mode further includes a mechanism of authentication inquiring and a mechanism for generating a derived key, and the authentication centre further includes: a third module, configured to, when the service entity requests the service, provide authentication inquiring for the service entity requesting the service and the service entity providing the service, and to calculate the shared derived key for protecting the communication between the two service entities according to the mechanism of authentication inquiring and the mechanism for generating the derived key included in the authentication mode negotiated by the first module.

In the above authentication centre the second module is configured to generate shared key materials and temporary identities for the two service entities, and the third module is configured to calculate the shared derived key according to the shared key materials and the temporary identities of the two service entities generated by the second module.

The beneficial effect brought by the technical solutions in accordance with the embodiments of the present invention is that, real generic authentication architecture is provided, wherein the authentication mechanism provided by the GAA can perform negotiating and choosing for multiple authentication mechanisms and authentication modules, which enhances the flexibility and generality of the authentication mechanism. In the framework according to the embodiments of the present invention, a service provider can be an application server in the mobile network, an application server in the open network, or a mobile terminal with powerful functions, which enables the service subscriber to use more abundant service resources. The authentication solution supports the situation that the mobile terminal is upgraded to be a service provider, which satisfies the demand that the mobile terminal with powerful functions desires to provide services.

DETAILED DESCRIPTIONS OF THE EMBODIMENTS OF THE INVENTION

The present invention is hereinafter further described in detail with reference to the accompanying drawings as well as embodiments so as to make the objective, technical solution and merits thereof more apparent.

Figure 1:
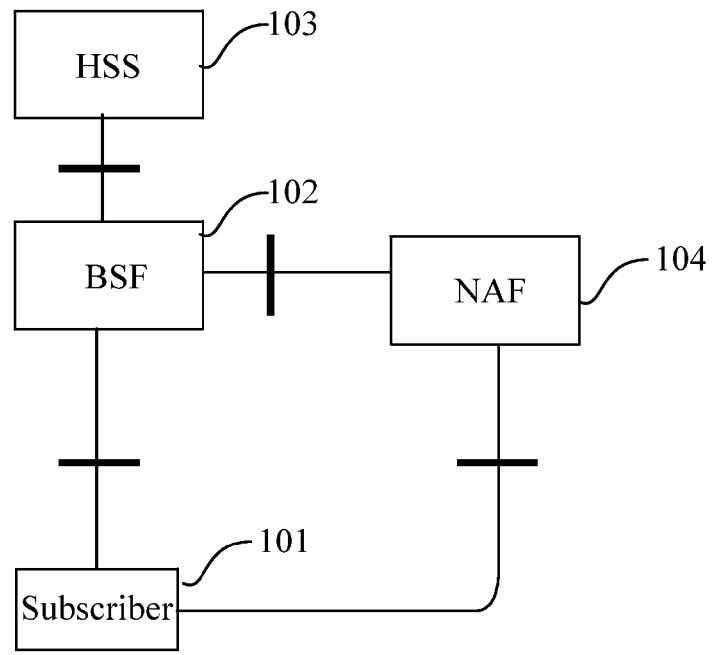
FIG. 1 is a schematic diagram illustrating the architecture of a Generic Authentication Architecture (GAA).
Figure 2:
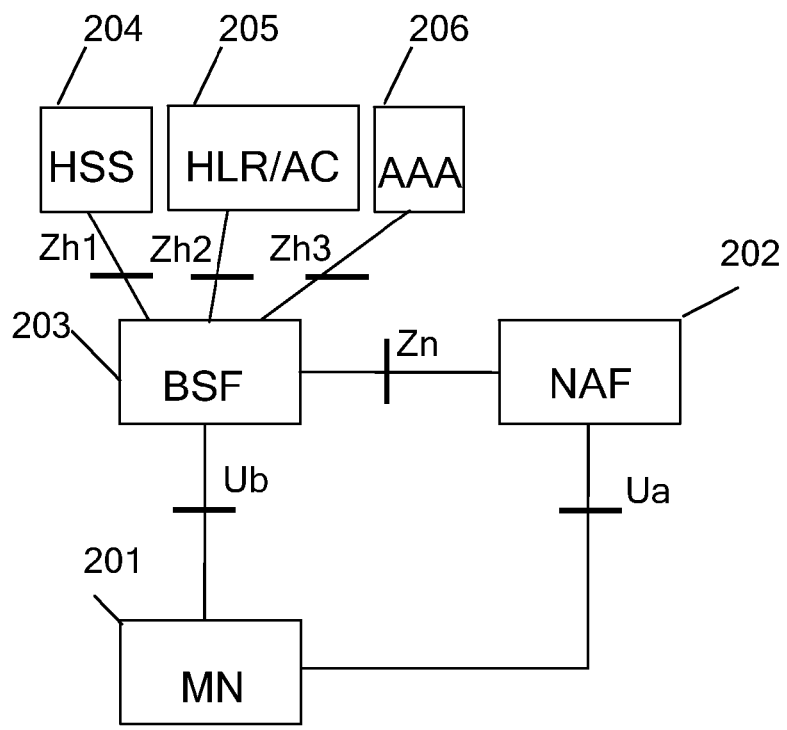
FIG. 2 is a diagram illustrating the architecture of a GAA in 3GPP2 in the prior art.
Figure 3:
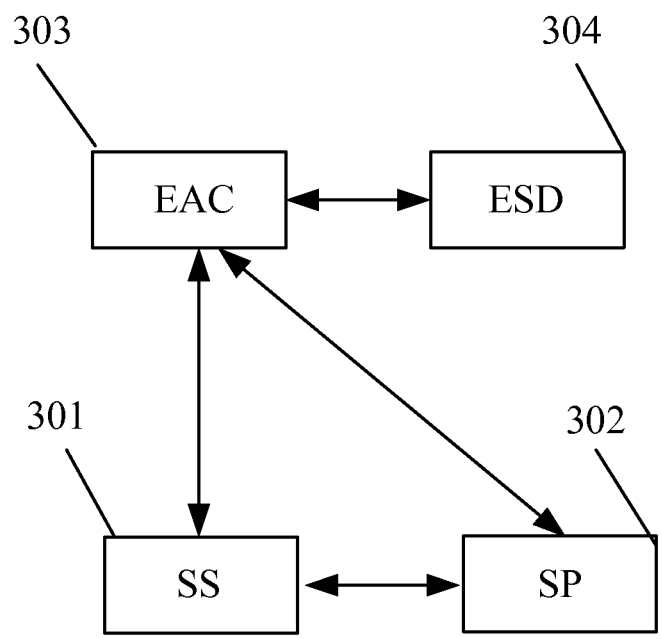
FIG. 3 is a schematic diagram illustrating the architecture of end-to-end communication authentication based on mobile networks according to the embodiments of the present invention.

FIG. 3 illustrates the architecture of an end-to-end communication authentication based on mobile networks according to an embodiment of the present invention. The architecture can be called generic authentication architecture in deed in that it is applicable for different mobile network standards and serves to establish a mutual trust relationship between different types of service entities. Besides two service entities, Service Subscriber (SS) 301 and Service Provider (SP) 302, the network elements involved in the generic authentication architecture further includes Entity Authentication Centre (EAC) 303 and Entity Subscription Database (ESD) 304 in the operator's network. In the architecture, the SS and the SP can communicate with each other, and the SS and the SP can respectively communicate with the EAC to perform their own authentication, and the EAC can connect with an ESD from which the information needed by authentication can be acquired. In the embodiments of the present invention, a service entity can be a service subscriber (SS) or a service provider (SP). The SS can be equivalent to the subscriber in the 3GPP GAA or the MN in the 3GPP2 GAA, the SP can behave as the NAF in the 3GPP GAA or in the 3GPP2 GAA, and the EAC can be equivalent to the BSF in the 3GPP GAA or in the 3GPP2 GAA.

When providing a service to a mobile subscriber, a majority of application servers first establish with the mobile subscriber a mutual trust relationship (for example, the trust relationship between the mobile subscriber and the authentication proxy, that between the mobile subscriber and the PKI certificate organization, that between the mobile subscriber and the content providing server, and the like). Generally, such trust relationship is established during the bidirectional authenticating procedure between the mobile subscriber and the application server. Along with the development of the mobile network, the types of the services are increasingly diversified. Meanwhile, the SP is not limited to the pure operator network, but can be a third party SP other than the operator network or even a mobile subscriber. That is, some mobile subscribers not only can use the application services provided by the network but also can provide some services to other subscribers in the network. There are three types of SPs in the embodiments of the present invention, including an AS of the operator network, a third party AS and a mobile subscriber. And there are two types of SSs, including a common mobile subscriber or a third party AS. Thus, the mobile subscriber can be the SS as well as the SP while the third party AS can be the SP and the SS. Therefore, as compared with the division of service entities into a subscriber and a SP, the service entities, in the embodiments of the present invention, are divided into three types: 1. an SS, a simple service subscriber which can only apply for services (generally is a common mobile subscriber), 2. an SP, a simple service provider (an AS of the operator network or an SP of an external network), 3. a service subscriber and provider (also referred as SSP) which is not only a service subscriber but also a service provider (can be a common mobile subscriber or a third party AS).

In the architecture illustrated in FIG. 3, the EAC is used for negotiating the authentication method and authenticating the service entity, and verifying the identity of end-to-end communication entities and the validity of the entity's requesting or providing services, and generating the derived key etc. The ESD stores the subscription information of the entity including the type of the service subscribed and/or provided by the entity, the authentication mechanism supported by the entity and authentication information, and so on. The subscription information of the entity is stored together with the private ID of the entity. Before the SP provides services to other entities or the SS requests services of other entities, a subscription relationship between the SP and the network or that between the SS and the network should exist and should be stored in the ESD.

The authentication procedure provided by the embodiments of the present invention includes the following stages.

The first stage (referred as an entity authentication process): the service entity first has to go to the EAC to negotiate the authentication mechanism and authenticate the identity of the service entity before each SS in the network communicates with the SP.

The process for negotiating the authentication mechanism is initiated by the service entity and the identity of the service entity and the security degree requirement of the service are carried in the request message for initiating the negotiation. The EAC selects an authentication mechanism according to the security degree, the network support conditions (e.g., the authentication modes the network supported) and entity subscription information, and returns the corresponding information to the service entity behaving as the authentication requester. Different security degrees of the service lead to different authentication modes selected. The authentication requester issues a conformation message to denote the end of negotiation procedure.

The service entity and the EAC will perform a mutual authentication between them according to the negotiated mechanism. The authentication is bidirectional. After the authentication, the authentication requestor (namely the service entity requesting the authentication) and the EAC generate a shared key material, and the EAC allocates a temporary ID and a corresponding life time to the authentication requestor according to its subscription information. If the authentication requestor is an SS, the EAC will allocate an Interim Service Request Identifier (ISR-ID) to it, and if the authentication requestor is an SP, the EAC will allocate to it an Interim Authentication Check Identifier (IAC-ID).

The EAC transfers the temporary ID of the service entity and the lifetime to the service entity requesting authentication. After this, the communication between the service entity requesting authentication and the EAC can be protected by using the shared key material generated in the authentication procedure between the service entity and the EAC.

The second stage (referred as an authentication inquiring process):

After performing the authentication with the EAC, the SS can request the SP for a service.

Upon the reception of the service request, if the SP or SSP has performed the authentication with the EAC and has acquired a valid IAC-ID, the SP or SSP can inquire of the EAC about the authentication condition of the SS. Otherwise, the SP or SSP has to communicate with the EAC first to perform the authentication and the key negotiation, and inquire of the EAC about the authentication condition of the SS by sending an inquiry request which carries the ISR-ID of the SS and the IAC-ID of the SP or SSP. Upon receiving the inquiry request, the EAC first inquires whether the SS and the SP have the authority according to the ID of the SS and that of the SP, then calculates a derived key for protecting the service communication between the SS and the SP by using their temporary IDs and the Ks negotiated with the EAC by the SS/SP, and transfers the derived key to the SP. Meanwhile, the SS calculates the derived key according to the same parameters and algorithm. The trust relationship established between the service entity and the EAC has a lifetime. If the lifetime is about to expire or has expired, the service entity needs a re-authentication procedure with the EAC to establish a new trust relationship.

The third stage (referred as a mutual authentication process between service entities): after acquiring the shared derived key, the SS and the SP may use the derived key to perform the mutual authentication between the two parties before each service communication, further generate a session key, Kr-SS-SP, for protecting the security of the communication, and then use the session key to protect the service communication.

Each stage of the authentication procedure provided by the embodiments of the present invention will be described in detail with reference to the attached drawings.

Figure 4:
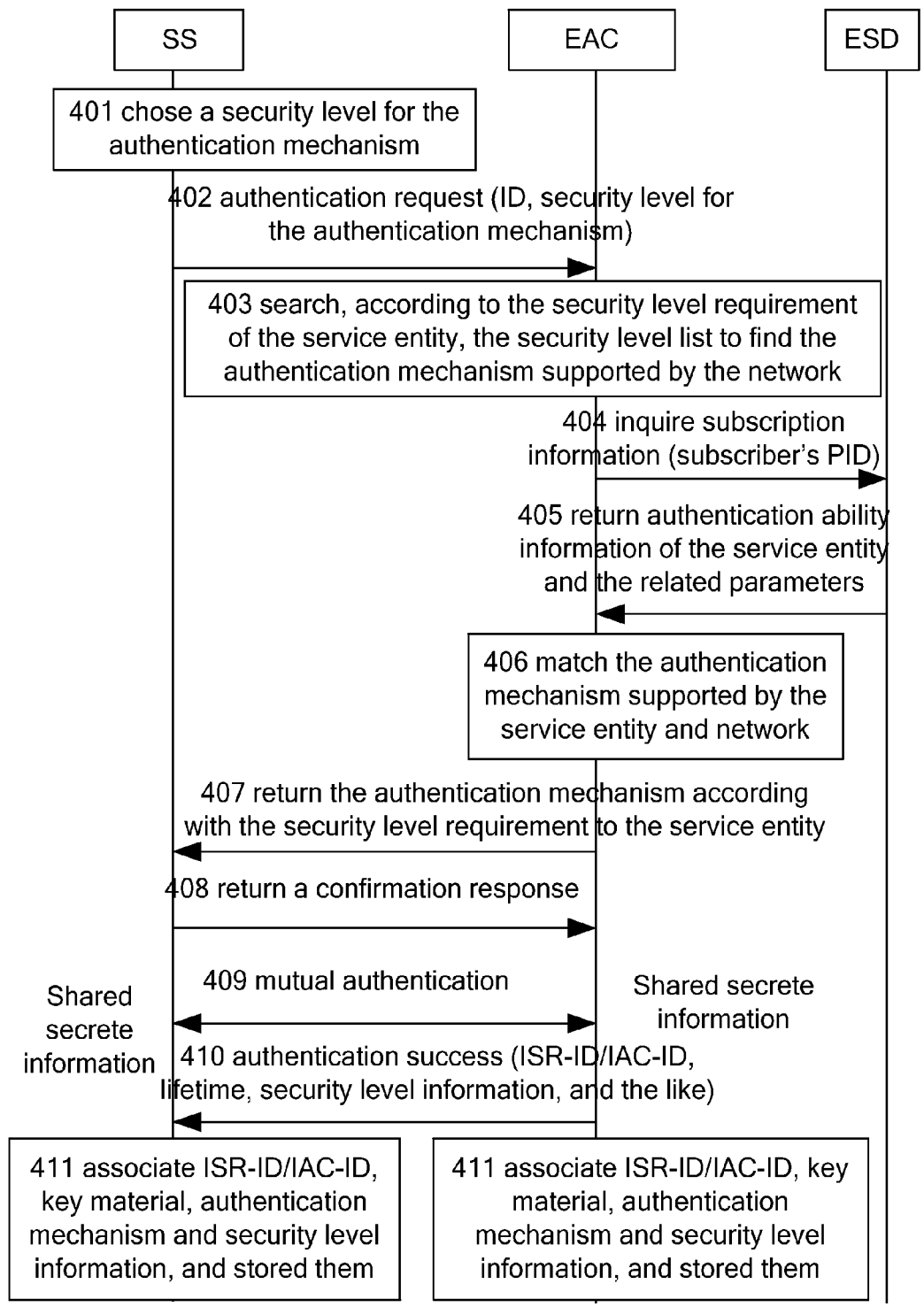
FIG. 4 is a flow chart illustrating the process of negotiating the authentication mechanism and performing mutual authentication between a service entity and an entity authentication centre in an embodiment according to the present invention.

FIG. 4 is a flow chart illustrating the process of negotiating the authentication mechanism and performing the mutual authentication between the service entity and the EAC in an embodiment according to the present invention. In this embodiment, the process of negotiating the authentication mechanism and performing the mutual authentication between the service entity and the EAC is initiated by the service entity as shown in FIG. 4, and includes the following steps.

Block 401: the service entity automatically chooses a security degree requirement (for example, a high security degree) of the authentication mechanism corresponding to the requested service or the provided service (for instance, a video conference service).

Block 402: the service entity transfers to the EAC an authentication request carrying the related information such as the ID of the service entity, the security degree of the authentication mechanism chosen by the service entity, and etc.

Block 403: upon receiving the authentication request, the EAC searches the security degree list stored in local to find at least one authentication mechanism currently supported by the network and satisfying the security degree requirement, including an authentication protocol and an enciphering algorithm. For instance, Http AKA is a mutual authentication protocol between the network and the terminal in the radio network. By performing this protocol, the two communication parties can authenticate the identity of each other and generate the same key respectively.

Block 404: according to the identity of the service entity, the EAC inquiries the subscription information stored in the ESD and gets the authentication information of the service entity, for example, the authentication mechanism supported by the service entity, which includes the authentication protocol, the enciphering algorithm, and other related parameters.

Block 405: the ESD returns to the EAC the authentication capability information (i.e., the supported authentication protocol, enciphering algorithm and etc) and other related parameters of the service entities.

Block 406: the EAC matches the authentication protocols and enciphering algorithms supported by the service entity and the network, according to the local policy, and determines the authentication protocol and enciphering algorithm (that is, the authentication mechanism) supported by both sides which is also in accord with the security degree requirement. If there is no authentication protocol and enciphering algorithm supported by both sides which is also in accord with the security degree requirement, the EAC returns an error indication to the service entity and terminates the current procedure.

Block 407: the EAC returns the chosen authentication mechanism including the authentication protocol and enciphering algorithm to the service entity.

Block 408: upon receiving the information returned by the EAC, the service entity decides the authentication mechanism and returns a confirmation response to the EAC.

Block 409: the service entity and the EAC use the chosen authentication protocol and enciphering algorithm to perform mutual authentication. After the successful authentication, both parties acquire the shared key material (also referred as shared secret information).

If the service entity is a mobile terminal, the shared key material can be a shared key (Ks). If the service entity is an application server (AS) in a mobile core network domain, the shared key material negotiated in the mutual authentication procedure between the service entity and the EAC may be a Security Association (SA), that is, a key and key algorithm information of security communication negotiated according to the Internet Protocol Security (IPSec).

Block 401: the EAC returns an authentication success response to the service entity and allocates a temporary ID for the service entity and the corresponding lifetime, including the following situations: 1) if the service entity issuing the authentication request to the EAC is a service subscriber (SS/SSP), the EAC will allocate an ISR-ID to the SS/SSP which is to be used if the SS/SSP requests other entities for services; 2) if the service entity issuing the authentication request to the EAC is a service provider (SP/SSP), the EAC will allocate an IAC-ID to the SP/SSP which is to be used if it needs to inquire the EAC about the authentication condition of the SS.

Block 411: the EAC and the service entity respectively stores the shared key material which is associated with the corresponding security degree, including: associating and storing the ISR-ID/IAC-ID, the key material, the authentication mechanism and the security degree.

Figure 5:
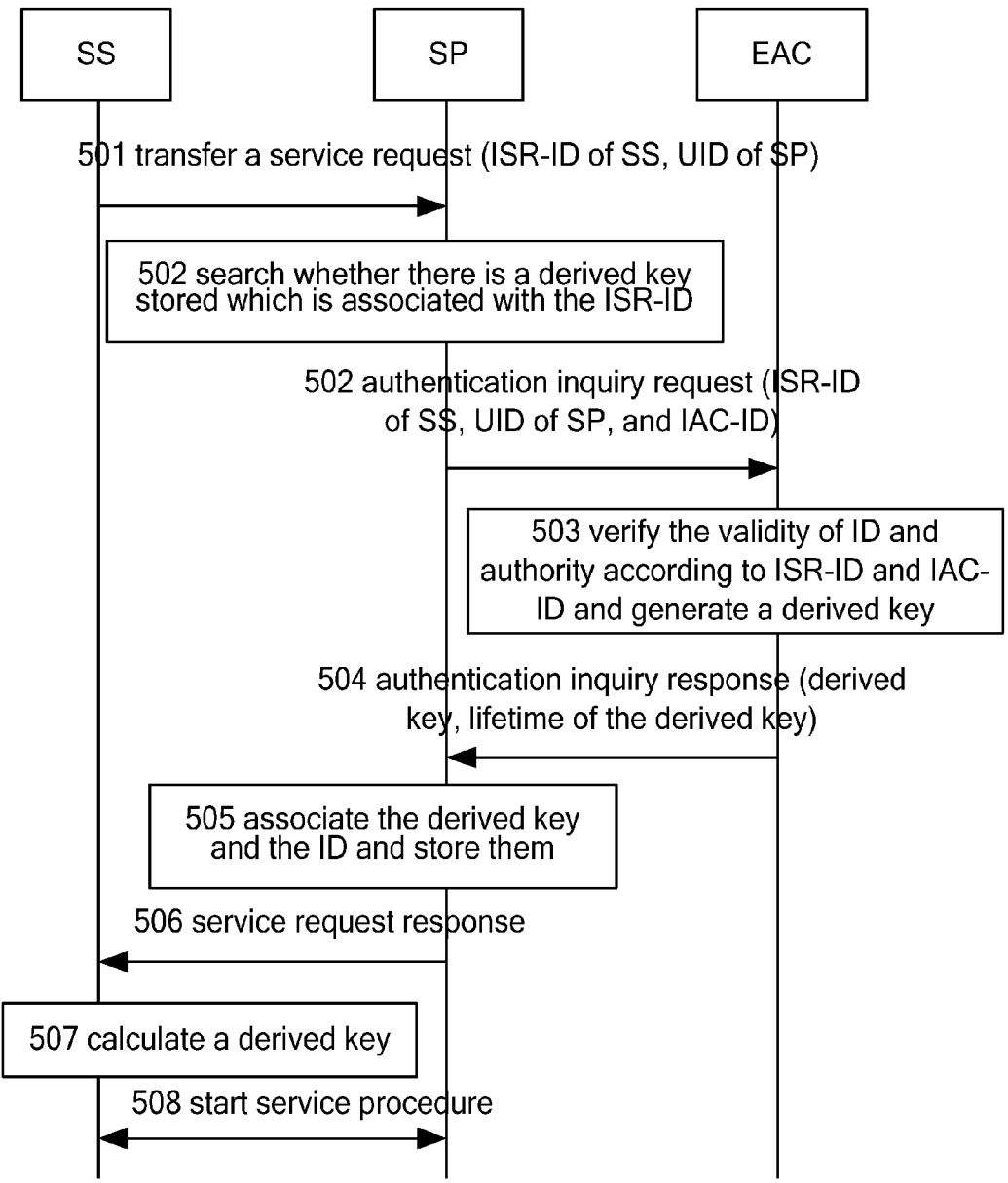
FIG. 5 is a flow chart illustrating the process of authentication inquiring between a service entity and an entity authentication centre in an embodiment according to the present invention.

FIG. 5 is a flow chart illustrating an authentication inquiring procedure between a service entity and an EAC in an embodiment according to the present invention. In this embodiment, after performing the mutual authentication, the service entity and the EAC will perform the authentication inquiring procedure, the detailed description of which is as shown in FIG. 5.

Block 501: a SS (or SSP) issues a service request to a SP (or another SSP) able to provide services, including the ISR-ID acquired by the SS in the authentication with the EAC and a public identity (UID) of the SP which is an ID for contacting with other service entities.

Different services provided by the same service entity correspond to different UIDs, so different services can be differentiated by their own UIDs.

Block 502: upon receiving the service request, the SP searches whether there is the ISR-ID of the SS stored locally to identify the SS. If there is the ISR-ID, the valid derived key associated therewith, the real identity information of the service entity and etc., stored, the SS and SP will use the derived key to protect the service between them. If finding that the derived key or the ISR-ID information is in a hypo-operation state or has been withdraw or destroyed, the SP notifies the SS that a re-authentication request should be initiated and the current procedure is terminated, wherein the detailed procedure of initiating the re-authentication is referred to the following text. If the ISR-ID is not stored, the SP sends an authentication inquiring request to the EAC and carries the ISR-ID of the SS and the IAC-ID and UID of the SP in the authentication inquiring request, and performs Block 503.

Block 503: upon receiving the authentication inquiring request, the EAC first inquires and decides whether the IAC-ID carried in the authentication inquiring request is valid and whether the SP is entitled to provide the service, and inquires and decides whether the ISR-ID carried in the authentication inquiring request is valid and whether the SS is entitled to request the service. If it is decided that the IAC-ID is valid and the SP is entitled to provide the service besides the ISR-ID is valid and the SS is entitled to request the service (namely passing authentication), the EAC generates a derived key for the SS and SP.

Block 504: the EAC returns to the SP an authentication inquiring response which carries the derived key generated in Block 503 and the lifetime of the key. If the authentication inquiring in Block 503 is successful (that is, the result of the inquiry and decision is yes), the newly derived key which is acquired by enciphering the shared key material of the SP and EAC, is carried in the returned authentication inquiring response. Otherwise, the EAC returns an error message, notifies the corresponding service entity of re-authenticating at the EAC, the detailed processing of which is referred to the following text, and terminates the current procedure.

Block 505: the SP acquires the newly generated derived key from the authentication inquiring response by decrypting, and associates the derived key, the lifetime, the ISR-ID of the SS and the UID of the SP and stores them in local.

Block 506: the SP returns a service request response to the SS.

Block 507: the SS calculates the same derived key by using the same parameters and key algorithm which may adopt the Data Encryption Standard (DES), the ternary DES (3-DES), the Advanced Enciphering Standard (AES) 256, AES 1024 and etc., wherein both 256 and 1024 represent the key length.

Block 508: the SS and the SP use the derived key to protect the service between them.

Since the trust relationship established between the service entity and the EAC by the authentication has a lifetime (such as the lifetime of the shared key material, the derived key, and the temporary ID), if the lifetime is about to expire or has expired, the service entity needs to connect with the EAC for the re-authentication between them to establish a new trust relationship.

Additionally, according to the different conditions of the shared key material or the temporary ID, the service entity may have the following states: 1. a hypo-operation state: the shared key material, the lifetime of the derived key or the temporary ID is about to expire, therefore the shared key material can not be used in enciphering calculation but can be used in decrypting and authenticating the entity ID; 2. a withdraw state: the shared key material, the lifetime of the derived key or the temporary ID has expired, and the corresponding relationship between the shared key material and the real ID of the entity or the corresponding relationship between the temporary ID and the real ID of the entity has been removed; 3. a destroyed state: the related records of the shared key material, the derived key or the temporary ID has been deleted. Thus, in case that at least one of the following situations occurs, it is needed to initiate the re-authentication procedure.

1. if finding, according to the local policy, that the shared key material of the service entity and the EAC or the temporary ID of the service entity is in the hypo-operation state, the EAC notifies the service entity that the re-authentication request should be initiated.

2. if finding, according to the local policy, that the shared key material or the temporary ID is in the withdraw or destroyed state, the EAC notifies the service entity that the re-authentication request should be initiated.

3. if the EAC can not find the related identity information and key information according to the temporary ID (that is, in the destroyed state), the EAC notifies the service entity that the re-authentication request should be initiated.

4. if finding, according to the local policy, that the derived key is in the hypo-operation state, the SP notifies the SS that the re-authentication request should be initiated.

5. if finding, according to the local policy, that the derived key is in the withdraw or destroyed state, the SP notifies the SS that the re-authentication request should be initiated.

6. if the SP can not find, according to the temporary ID, the corresponding identity information and key information (that is, in the destroyed state), the SP notifies the SS that the re-authentication request should be initiated.

When the EAC notifies the service entity that the re-authentication request should be initiated, the reason for the re-authentication is identified in the notification. If the reason for re-authentication is that the shared key material or the temporary ID is in the hypo-operation state, the service entity will use the temporary ID to identify itself in the initiated re-authentication request. Upon receiving the re-authentication request, the EAC decides, according to the temporary ID, that it doesn't need to negotiate the authentication mechanism, and thus adopts the originally used authentication mechanism to perform the mutual authentication. If the reason for the re-authentication is that the shared key material or the temporary ID is in the withdraw or destroyed state, or the key material can not be found according to the temporary ID when needed, the service entity will use the private ID to identify itself in the initiated re-authentication request. Upon receiving the re-authentication request, the EAC decides, according to the private ID, that it is needed to negotiate the authentication mechanism, wherein the procedure of re-negotiating authentication mechanism is the same as the initial authentication procedure as shown in FIG. 4.

Similarly, when the SP notifies the SS that the re-authentication request should be initiated, the reason for the re-authentication should also be identified in the notification. If the reason for re-authentication is that the temporary ID is in the hypo-operation state, the SS will use the temporary ID to identify itself in the initiated re-authentication request. Upon receiving the re-authentication request, the EAC decides, according to the temporary ID, that it doesn't need to negotiate the authentication mechanism, and thus uses the originally used authentication mechanism to perform the mutual authentication. If the reason for re-authentication is that the temporary ID is in the withdraw or destroyed state, the SS will use the private ID to identify itself in the initiated re-authentication request. Upon receiving the re-authentication request, the EAC decides, according to the private ID, that it doesn't need to negotiate the authentication mechanism, wherein the procedure of re-negotiating authentication mechanism is the same as the initial authentication procedure as shown in FIG. 4.

If using the temporary ID (i.e., ISR-ID/IAC-ID) or the shared key material (i.e., Ks/Kp) associated therewith, the service entities (SS or SP) or the EAC should verify whether the temporary ID or the shared key material is in the hypo-operation, withdraw or destroyed state. If the temporary ID or the shared key material is in the hypo-operation, withdraw or destroyed states, the service entity or the EAC should initiate a re-authentication procedure between the corresponding service entity and EAC. In the authentication procedure, if receiving a message indicating the failure reasons, the service entity or the EAC may also initiate the re-authentication procedure. Moreover, if the SP finds that the shared derived key with the SS is in the hypo-operation, withdraw or destroyed states, it sends a re-authentication request to the SS and indicates the re-authentication reason in the request. And if only the shared derived key is in the hypo-operation, withdraw or destroyed states while the temporary IDs of the SS and SP is in the normal state, the SS and SP need not perform the original entity authentication with the EAC, the SS should originates the authentication inquiring procedure to the EAC, so that the EAC would generate a new shared derived key for the SP, and the SS would generate the same shared derived key by itself.

Herein lies the example of the lifetime and the hypo-operation state. Taking the lifetime of the shared key material as an example, assuming that the lifetime of the shared key material is 48 hours and that in the period from 44 hours to 48 hours it is in the hypo-operation state, if the shared key material has been live for 45 hours, it can be decided that the shared key material is in the hypo-operation state of its live cycle.<0}

Figure 6:
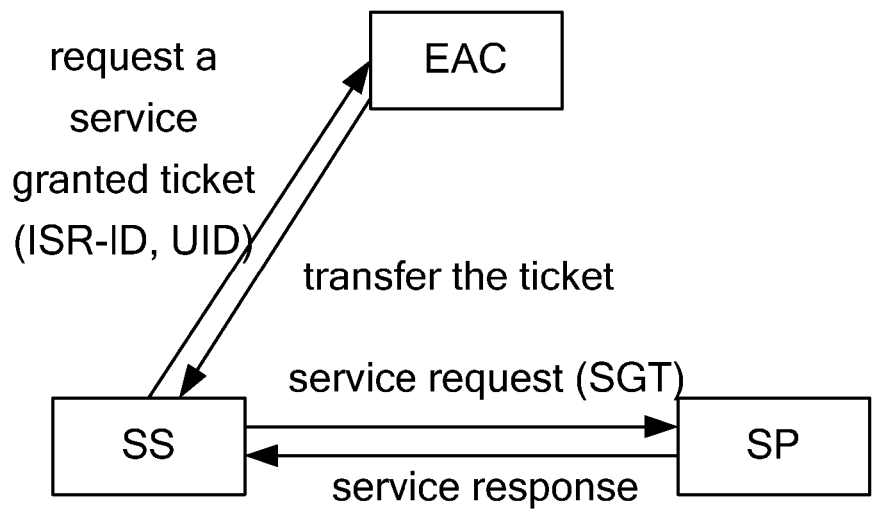
FIG. 6 is a schematic diagram illustrating an end-to-end authentication model combined with a Kerberos model.

If the Entity Authentication Centre (EAC) has the functions of a Kerberos server, the mechanism of authentication inquiring combined with the Kerberos model can be used. FIG. 6 is a schematic diagram illustrating an end-to-end authentication model combined with the Kerberos model. As shown in FIG. 6, a SS makes a request to the EAC for a service granted ticket (SGT) and provides the ISR-ID of the SS and the UID to the EAC. The EAC checks the validity of the ISR-ID and the IAC-ID, generates the service granted ticket and returns the service granted ticket to the SS. When issuing the service request to the SP, the SS carries the service granted ticket in the request. The SP generates a derived key according to the service granted ticket and then returns the SS a service response.

Figure 7:
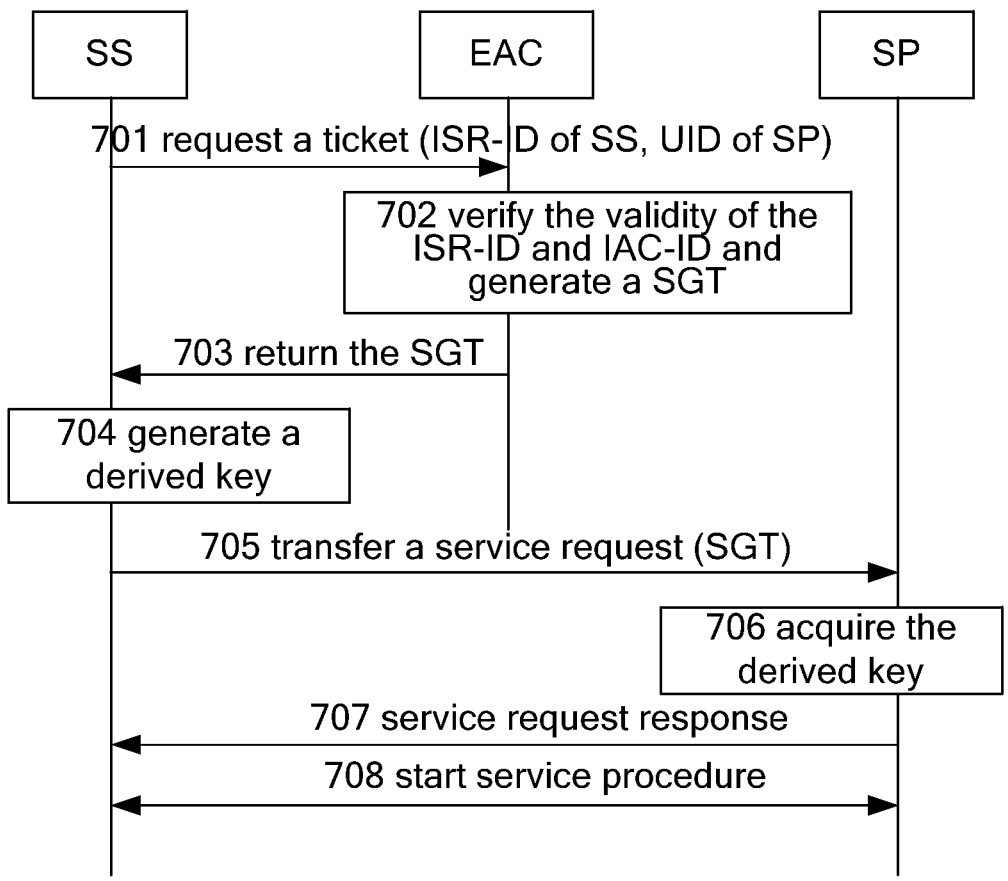
FIG. 7 is a block diagram illustrating the process of authentication inquiring combined with a Kerberos model.

FIG. 7 is a schematic diagram illustrating the process of authentication inquiring combined with the Kerberos model illustrated in FIG. 6. As shown in FIG. 7, the detailed steps are as follows:

Block 701: when desiring to acquire a certain service, the SS first searches whether the service granted ticket corresponding to the service has been stored locally. If it has been stored, go to Block 705. If it has not been stored, the SS transfers to the EAC a service granted ticket request carrying the ISR-ID of the SS and the UID of the SP providing the service.

Block 702: upon receiving the service granted ticket request, the EAC checks the validity of the identity and authority. First, the EAC decides whether the SS is entitled to use the service by inquiring whether the ISR-ID carried in the request is valid, and then acquires the IAC-ID of the SP according to the UID of the SP carried in the request, and decides whether the SP is entitled to provide the service by deciding whether the IAC-ID is valid.

If the above decision shows that the SP is entitled to provide the service (that is, the SP is legal), the EAC calculates, according to the identities of the SS and SP, and the shared key material of the SS and the EAC, a derived key K-SSP/SP for protecting the service communication between the SS and the SP. The EAC further generates a service granted ticket including the derived key and the identities of the SS and the SP, and uses the shared key material of itself and the SP to encipher the SGT.

If the decision shows that the SP is not entitled to provide the service (namely, the SP is illegal), the EAC will transfer an error message and notify the corresponding entity of authenticating its identity at the EAC and terminate the current procedure.

Block 703: the EAC transfer the above enciphered SGT to the SS.

Block 704: upon receiving the SGT, the SS locally generates the same derived key with the one the EAC generates by adopting the same parameters and algorithm used by the EAC.

Block 705: the SS transfers to the SP a service request which caries the SGT.

Block 706: the SP decrypts the SGT to acquire the derived key.

Block 707: the SP returns a service request response identifying success to the SS.

Block 708: the SS and the SP use the derived key to protect the service between them.

Other than the above blocks, the EAC can use the shared key material of itself and the SS to encipher the derived key and transfer the enciphered derived key to the SS. Thus, the SS can acquire the derived key by decrypting instead of re-calculating locally.

Similarly, after acquiring the shared derived key, the SS and the SP may use the derived key to perform the mutual authentication between the two parties before each service communication starts, and further generate a session key, Kr-SS-SP, for protecting the security of the communication, and then use the session key to protect the service communication.

Figure 8:
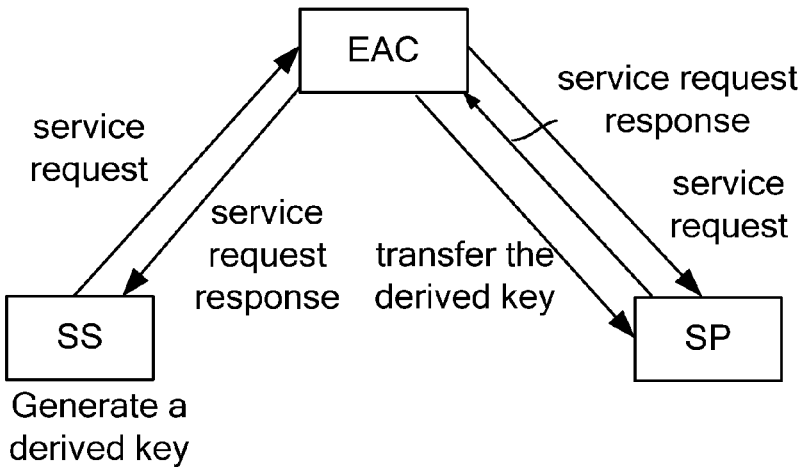
FIG. 8 is a schematic diagram illustrating an end-to-end authentication model combined with a Mediation model.

If the EAC has the functions of the Trusted Third Party (TTP) serving as an interceder, the mechanism of authentication inquiring combined with a Mediation model can be adopted as well. FIG. 8 is a schematic diagram illustrating an end-to-end authentication model combined with the Mediation model. As shown in FIG. 8, the SS issues a service request to the EAC to request the service provided by the SP. The EAC forwards the service request to the SP after deciding that the SS is legal. The SP returns a service request response carrying its own IAC-ID to the EAC. The EAC decides the validity of the SP according to the IAC-ID. If the SP is legal, the EAC calculates the derived key between the SS and the SP and transfers the derived key to the SP and returns a service request response to the SS at the same time. The SS calculates a same derived key upon receiving the response.

Figure 9:
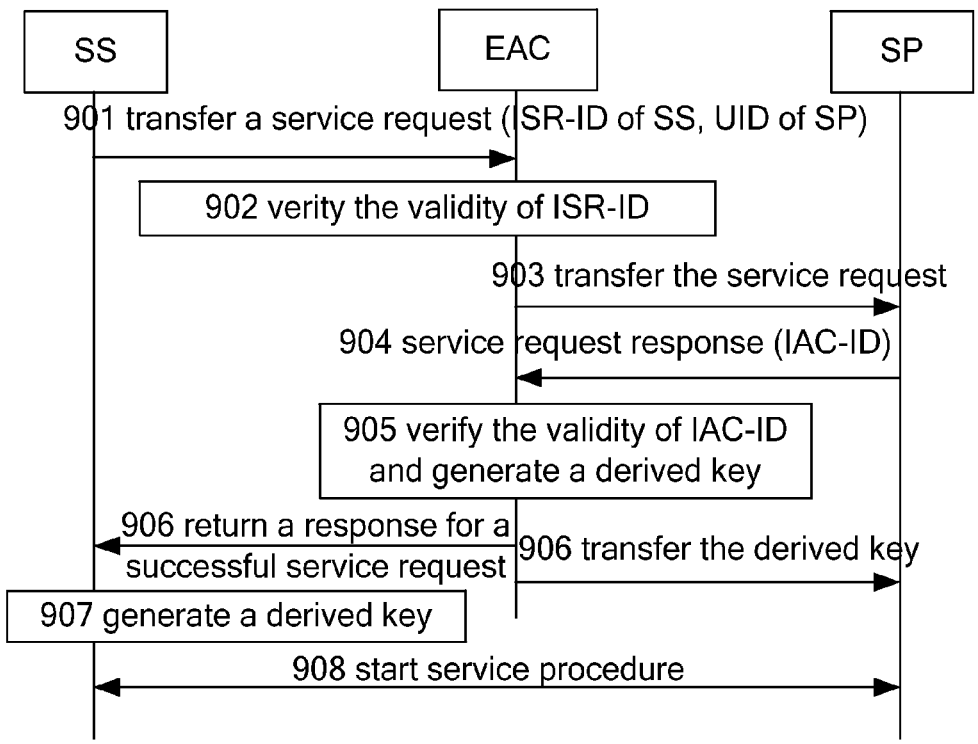
FIG. 9 is a block diagram illustrating the process of authentication inquiring combined with a Mediation model.

FIG. 9 is a flow chart illustrating the process of authentication inquiring combined with the Mediation model shown in FIG. 8. As shown in FIG. 9, the detailed blocks are as follows:

Block 901: if desiring to use a service provided by an SP, an SS first issues to the EAC a service request which carries the ISR-ID of the SS and the UID of the SP.

Block 902: the EAC decides the validity of the ISR-ID of the SS and the subscription information of the SS to decide whether the SS is entitled to request the service.

Block 903: if the SS is legal, the EAC forwards the service request to the SP and performs Block 904. If the SS is illegal, the EAC transfers an error message to the SS to notify the SS of authenticating its identity at the EAC and terminates the current procedure.

Block 904: the SP returns a service request response carrying its own IAC-ID.

Block 905: the EAC verifies the validity of the IAC-ID and the subscription information of the SP to decide whether the SP is entitled to provide the service. If the SP is legal, the EAC calculates a derived key for protecting the service communication between the SS and the SP according to the identities of the SS and the SP and the shared key material of the SS and the EAC, and performs Block 906. If the SP is illegal, the EAC transfers an error message to the SP to notify the SP of authenticating its ID at the EAC, and terminates the current procedure.

Block 906: the EAC transfers a service request success response to the SS and transfers to the SP the derived key enciphered by the shared key material of the EAC and the SP.

Block 907: upon receiving the service request success response transferred by the EAC, the SS adopts the same parameters and algorithm used by the EAC to acquire the derived key.

Block 908: the SS and the SP use the derived key to protect the service between them.

Similarly, after acquiring the share derived key, the SS and the SP may use the derived key to perform the mutual authentication between the two parties before each service communication starts, and further generate a session key, Kr-SS-SP, for protecting the security of the communication, and then use the session key to protect the service communication.

The foregoing statement just illustrates the embodiments of the present invention. In other similar situations, such as the SSP serving as a service entity, the figure of the SSP can be varied. In case that the SSP requests a service, its processing manner is the same as that of the above SS while in case that the SSP provides a service, its processing manner is the same as that of the SP. Therefore, the general variations and replacements occurred within the scope of the embodiments of the present invention and made by those skilled in the art should be covered by the protection scope of the present invention.

Several embodiments of the authentication procedures of the first stage and second stage in the authentication method of the embodiments according to the present invention are described hereinafter.

Figure 10:
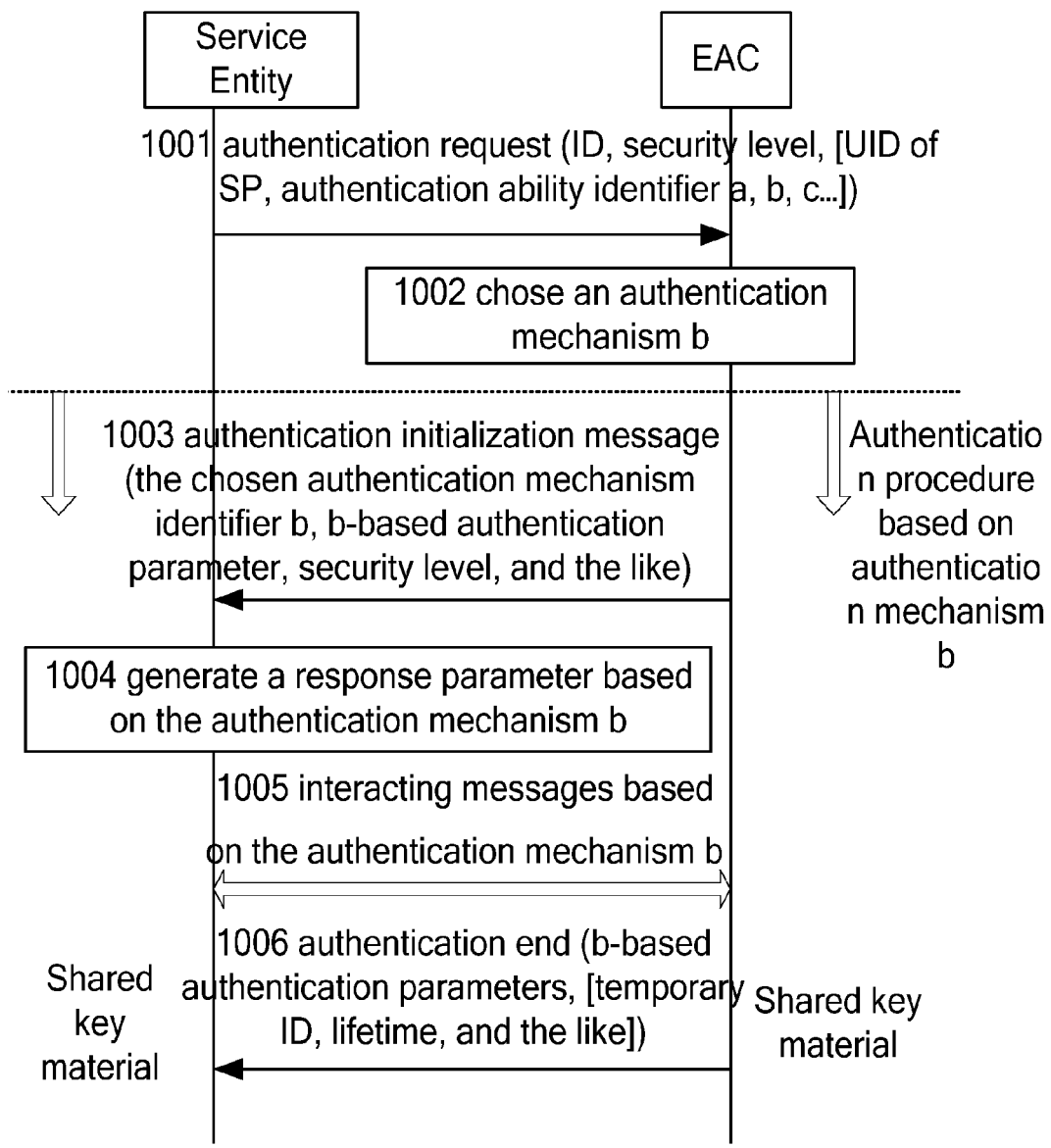
FIG. 10 is a flow chart illustrating a method for authenticating service entities in an embodiment according to the present invention.

FIG. 10 is a flow chart illustrating a method for authenticating service entities in an embodiment according to the present invention. Referring to FIG. 10, the descriptions of the authentication method according to the present invention are as follows.

Block 1001: a service entity transfers to the EAC an authentication request carrying the identity information of the service entity, security degree information, the information of at least one authentication mechanism supported by the service entity (if the information of the at least one authentication mechanism supported by the service entity is stored in the subscription information of the network, the information of the authentication mechanism may not be carried), and etc.

The identity information may include a private ID (PID) or a UID. With respect to selecting a security degree, the following situations may be considered. 1) The service entity may select the security degree corresponding to the desired service by searching the service security degree list stored in local. 2) If the service entity does not store the security degree list locally, the security degree may be selected by the subscriber manually through a human-computer interface. 3) The service entity may only provide the UID of the SP providing the corresponding service to the EAC without selecting the security degree, wherein the UID can identify the type of the service provided by the SP. Then, the EAC can search the security degree list according to the type of the service thereby selecting the corresponding security degree.

Block 1002: upon receiving the authentication request, the EAC searches the subscription information stored in the ESD according to the ID in the request, and selects an authentication mechanism according to the local policy considering the authentication mechanism, supported by the service entity and the network, and the security degree. The authentication mechanism selected in this embodiment is identified as authentication mechanism b. The supported authentication mechanism may include AKA, SIM, CAVE, MN-AAA key, TLS-PSK or TLS-Cert, DH and etc.

When the network and the service entity only support one authentication mechanism, the two parties can adopt the authentication mechanism to perform mutual authentication without negotiation. When selecting the security degree, the EAC may consider the security degree requirement of the service or not, that is, the security degree as a condition is optional for the authentication negotiation procedure.

Block 1003: the EAC transfers to the service entity an authentication initialization message carrying the identifier of the authentication mechanism selected in Block 1002, and the security degree (if the security degree is considered in the negotiation procedure in Block 1002, the security degree should not be lower than the security degree selected by the service entity), and etc.

If the follow-up authentication interaction procedure is initiated by the EAC, the authentication initialization message should include the information carried by the first authentication message in the procedure bade on the authentication mechanism. The contents of the first authentication message, in terms of the AKA authentication, are authentication vectors, while in terms of the TLS authentication manner, the contents are Hello Request.

Block 1004: the service entity obtains the authentication mechanism. If the follow-up authentication is initiated by the service entity, the service entity calculates the authentication information, while if the follow-up authentication is initiated by the EAC, the service entity will calculate the response value after receiving the related authentication information.

Block 1005: the authentication interaction procedure based on the selected authentication mechanism is performed between the service entity and the EAC.

Block 1006: after the authentication, both the service entity and the EAC get the shared key material and the EAC allocates to the service entity an ISR-ID or IAC-ID which is stored associated with the shared key material and can serve as an index for searching the shared key material or a Session ID of a security connection.

Figure 11:
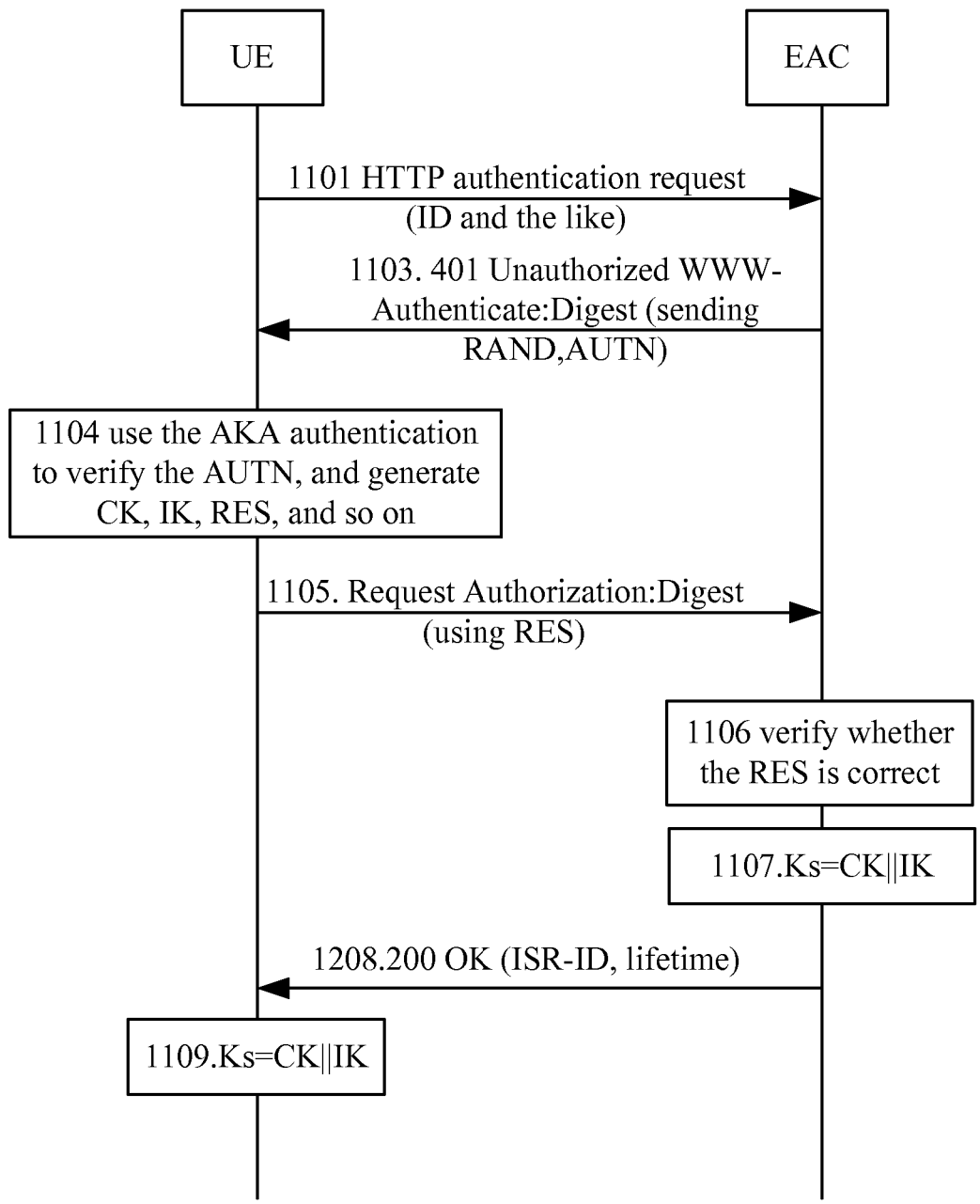
FIG. 11 is a flow chart illustrating a method for authenticating service entities in a 3GPP radio network according in an embodiment according to the present invention.

FIG. 11 is a flow chart illustrating a method for authenticating service entities of a 3GPP radio network in an embodiment according to the present invention. Referring to FIG. 11, in this embodiment, the service entity is an SS. In case that the SS is a mobile terminal in the 3GPP network, namely a UE in FIG. 11, and only supports the AKA authentication, the authentication procedure is as follows.

Block 1101: a UE issues to the EAC a HTTP Digest authentication request carrying its own ID.

Block 1102: since the 3GPP network and the UE only support the AKA mechanism, the two parties directly adopt the AKA mechanism to authenticate without negotiating the authentication mechanism. From the ESD, the EAC obtains the authentication vector of the UE subscriber (RAND, AUTN, RES, CK, IK).

Block 1103: the EAC transfers to the UE a HTTP 401 message (including Digest AKA challenge), carrying the RAND and the AUTN in the authentication vector.

Block 1104: the UE calculates and verifies the validity of the AUTN to confirm whether the message including the Digest AKA challenge comes from an authorized network, and calculates the CK, IK, and RES.

Block 1105: the UE transfers to the EAC an HTTP request message including a Digest AKA response and an abstract value calculated by the RES calculated.

Block 1106: the EAC verifies the accuracy of the calculated abstract value to authenticate the validity of the UE.

Block 1107: the EAC generates a key material, Ks=CK||IK, and ISR-ID, the generating method and format of which are the same as those of the B-TID in the 3GPP generic authentication architecture.

Block 1108: the EAC transfers to the UE a 200 OK message to identify the successful end of the authentication, wherein the message which is enciphered by the Ks includes the life time of the key material and the ISR-ID.

Block 1109: the UE also generates the same key material, Ks=CK||IK, acquires the ISR-ID and the lifetime of the key material by decrypting, stores the ISR-ID and the lifetime of the key material in local, and associates them with the authentication mechanism.

Figure 12:
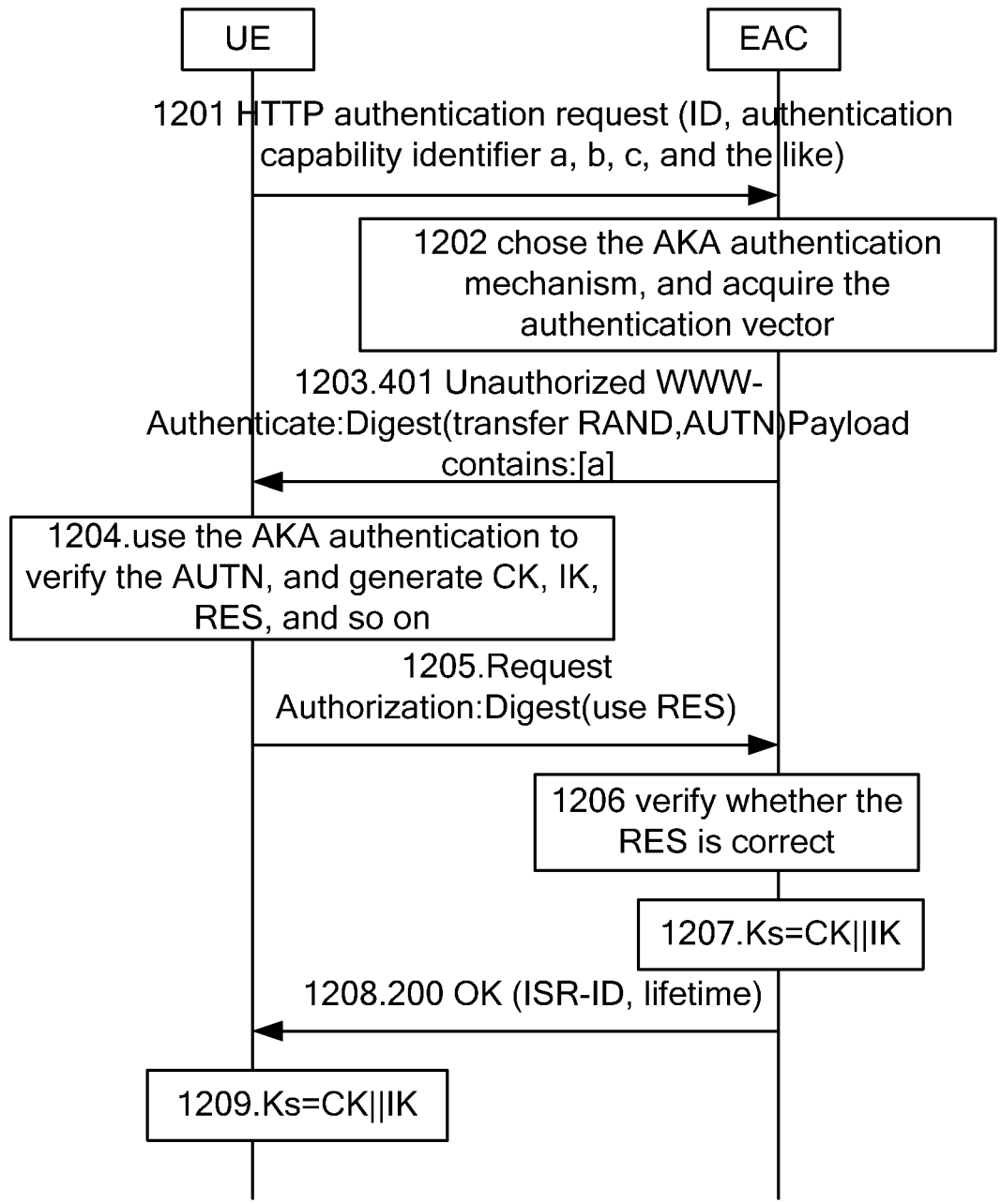
FIG. 12 is a flow chart illustrating a method for authenticating service entities in a 3GPP2 radio network in an embodiment according to the present invention.

FIG. 12 is a flow chart illustrating a method for authenticating service entities in a 3GPP2 radio network in an embodiment according to the present invention. In this embodiment, the service entity is an SS. In case that the SS is a UE and supports such authentication methods as the AKA authentication, certificate authentication and etc., while the 3GPP2 network supports the AKA authentication, CAVE-based authentication mechanism, and MN-AAA-based authentication mechanism, the authentication procedure is as follows referring to FIG. 12.

Block 1201: the UE issues to the EAC an HTTP authentication request carrying the identity of the UE and the authentication modes the UE supported, such as the AKA authentication and the certificate authentication.

Block 1202: the EAC searches in the ESD the UE's subscription information according to the UE's identity, and decides that the two parties use the AKA mechanism to perform authentication by adopting the local policy according to the self-supported authentication mechanism types, such as the AKA authentication, CAVE-based authentication mechanism, and MN-AAA-based authentication mechanism. The EAC acquires from the ESD the UE subscriber's authentication vector, (RAND, AUTN, RES, CK, IK).

Block 1203: the EAC transfers to the UE an HTTP 401 message (including Digest AKA challenge) carrying RAND and AUTN, and puts the authentication mechanism identifier in the payload information of this message.

Block 1204: the UE calculates and verifies the accuracy of the AUTN to confirm whether the message including the challenge comes from an authorized network, and calculates the CK, IK, and RES.

Block 1205: the UE sends to the EAC an HTTP request message including Digest AKA response and an abstract value calculated by the RES.

Block 1206: the EAC verifies the accuracy of the abstract value to authenticate the validity of the UE.

Block 1207: the EAC generates a key material, Ks=CK∥IK, and the ISR-ID, the generating method and format of which are the same as those of the B-TID in the 3GPP2 generic authentication architecture.

Block 1208: the EAC sends to the UE a 200 OK message to identify the successful end of the authentication, wherein the message is enciphered by the Ks and includes the ISR-ID and the lifetime of the key material.

Block 1209: the UE also generates the same Ks=CK∥IK, and then acquires the ISR-ID and the lifetime of the key material by decrypting, associated the ISR-ID and the lifetime of the key material with the authentication mechanism, and stores them in local.

After receiving the authentication request, if the UE supports the CAVE-based authentication mechanism as well, the EAC searches the subscription information according to its own identity, and eventually decides the CAVE-based authentication mechanism should be used by adopting the local policy, considering the types of authentication modes it supports, and the flow-up authentication procedure is the same as the CAVE-based authentication procedure in the 3GPP2 generic authentication architecture. If it is decided to use the AAA authentication mechanism, the generic authentication architecture in the embodiments of the present invention can also be used according to the same principle.<0}

Figure 13:
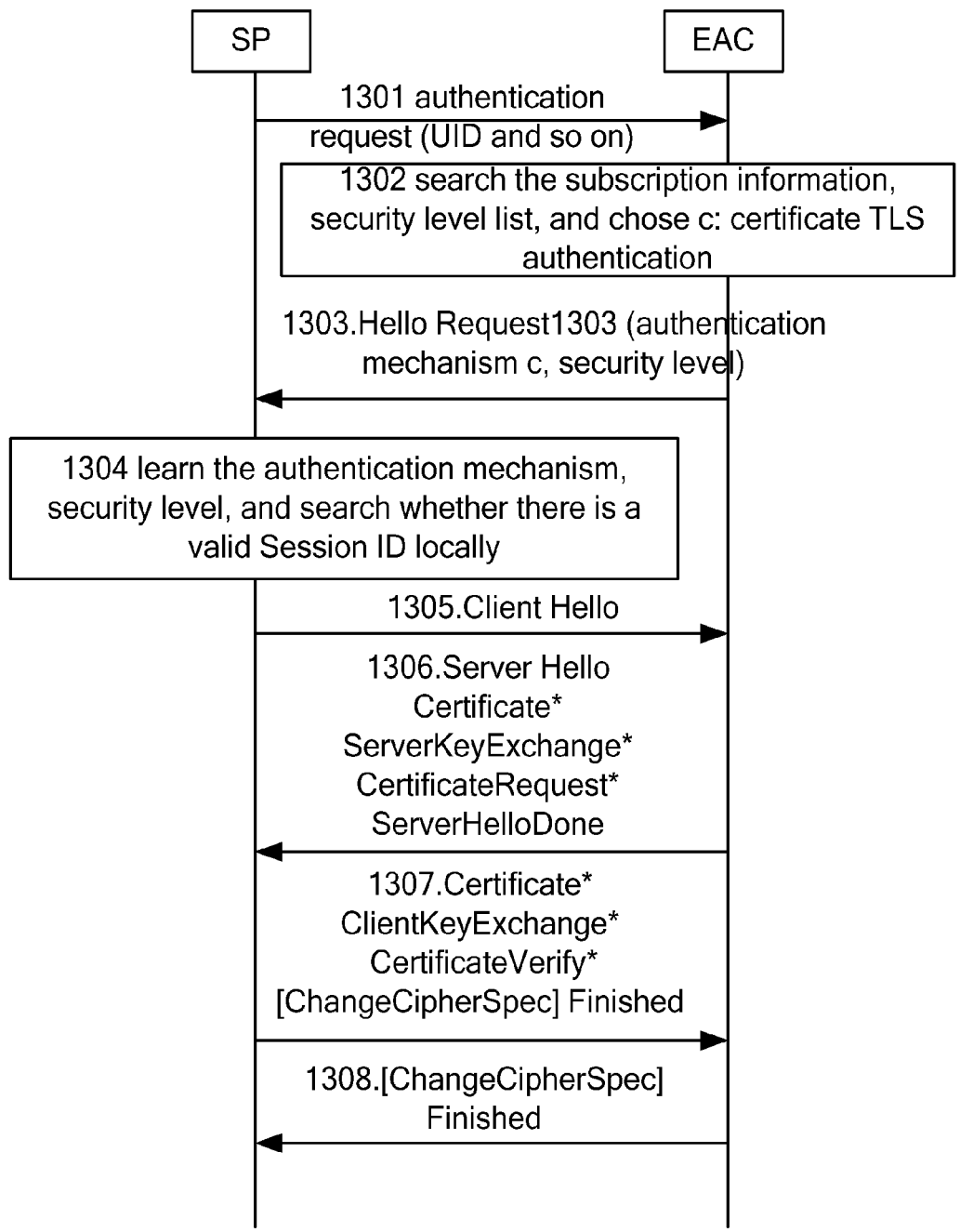
FIG. 13 is a flow chart illustrating a method for authenticating mutually between a SP and an entity authentication centre, in case that the SP is a bank, in an embodiment according to the present invention.

FIG. 13 is a flow chart illustrating a method for authenticating mutually between a SP and an entity authentication centre, in case that the SP is a bank, in an embodiment according to the present invention. In this embodiment, the service entity is a bank SP. When the bank SP desires to provide a mobile phone bank service for a UE, it first needs to perform mutual authentication with the EAC to generate a shared key material and establish a security connection, and the authentication procedure is as follows, referring to FIG. 13.

Block 1301: a SP transfers to the EAC an authentication request carrying its own UID.

Block 1302: the EAC searches the subscription information of the SP according to the UID, and after deciding that the SP is entitled to provide the service, acquires the information of authentication capability of the SP, that is, the authentication modes supported by the SP, such as the certificate, the certificate TLS authentication, the pre-shared key-based TLS authentication, and etc.

Then, the EAC searches the service security degree list, decides that the mobile phone bank service belongs to the high security degree service, and finds that the authentication modes supported by the network with the high security degree include the HTTP Digest AKA, the certificate TLS authentication, and etc by searching the authentication security degree list. And the EAC eventually matches the authentication mechanism supported by the SP and determine the authentication mechanism used in the mutual authentication. In this embodiment, it is decided to use the certificate TLS.

Block 1303: the EAC initiates to the SP a Hello Request message carrying an authentication mechanism identifier (in this embodiment, is the identifier of the certificate TLS authentication) and a security degree identifier.

Block 1304: the SP learns that the authentication mechanism is the certificate TLS, searches whether there is locally a Session ID: IAC-ID. If a TLS security channel has been established through the certificate TLS authentication of the EAC and the channel is still valid, the Session ID can be an index of the TLS security channel.

Block 1305: the SP transfers a Client Hello message to the EAC. If the SP has not stored a valid Session ID, the Session ID filed of the message is null, and if the SP has stored a valid Session ID: IAC-ID, the Session ID field of the message is the IAC-ID.

Block 1306: upon receiving the Client Hello message, the EAC verifies whether the Session ID field is null. If the Session ID field is not null and associated security connection information can be matched with the information carried in the Session ID field, the EAC directly transfers a Finished message to the SP to verity whether the authentication result of the security connection and the shared key material are available. After verifying that the parameters in the Finished message are correct, the SP returns another Finished message to the EAC. If the EAC verifies that the parameters in the Finished message are correct, the two parties re-use the security connection.

If the Session ID file is null or the above Finished message has an error, the EAC returns in turn a Server certificate message, a ServerKeyExchenge message (optional), and a CertificateRequest message, according to the parameters in the local policy configuration message. Eventually, the EAC returns a ServerHelloDone message to show that the ServerHello and related messages have been transferred.

Block 1307: upon receiving the ServerHelloDone message, the SP returns a Certificate message and then transfers a ClientKeyExchange message through which the two parties acquire the shared secrete parameters. Then, the SP transfers a CertificateVerify message to the EAC to facilitate the EAC in verifying the certificate of the SP clearly. At last, after transferring a ChangeCipherSpec message, the SP transfers a Finished message to the EAC at once to identify that the key exchange and authentication procedure are successful.

Block 1308: the EAC verifies whether the information in the Finished message of the SP is correct. If the information is not correct, terminate the current handshake procedure, and if the information is correct, return another Finished message to the SP. If the SP verifies that the information in the Finished message is correct, it means that the authentication and key exchange procedure between the two parties are successful.

This embodiment provides a uniform procedure for authenticating the NAF in the 3GPP/3GPP2 network, which is also applicable for the generic authentication architecture according to the present invention.

Figure 14:
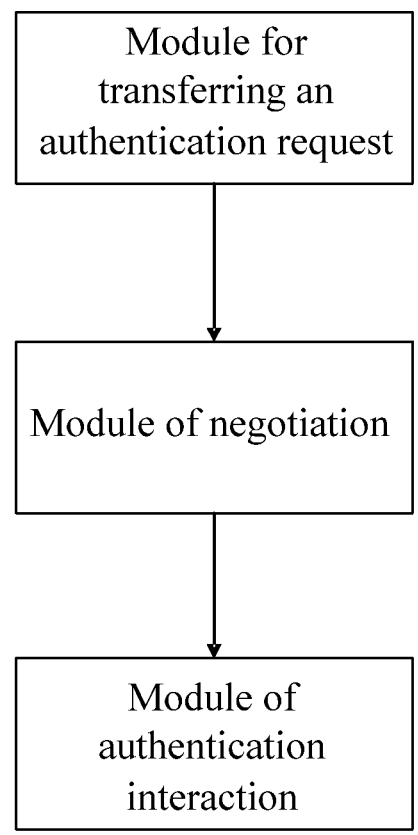
FIG. 14 is a schematic diagram illustrating the structure of an embodiment of an authentication apparatus according to the embodiment of the present invention.

Based on the above embodiments of the present invention, an apparatus of entity authentication is also provided. FIG. 14 is a structure chart illustrating an embodiment of an apparatus of authentication in the embodiments of the present invention. Referring to FIG. 14, the apparatus of entity authentication includes a module for transferring authentication requests, a module of negotiation, and a module of authentication interaction.

The module for transferring authentication requests is used for transferring the authentication request for the service entity to the EAC, wherein the contents of the authentication request include the identity of the service entity. The module of negotiation is configured to choose an authentication mechanism according to the local policy for the EAC after receiving the authentication request. The module of authentication interaction is used for performing authentication interaction based on the chosen authentication mechanism between the service entity and the EAC. The principles of these modules for performing the functions have been described in the above procedures, and they will not be described herein.

On the basis of the above authentication solutions, an enhanced solution is provided by the embodiments of the present invention, including, first defining the authentication mode which on the whole defines the service entity authentication, the authentication inquiring procedure and the mutual authentication between the service entities, including an authentication mechanism between the service entity and the EAC, a mechanism of authentication inquiring and a mechanism for generating a derived key, an authentication mechanism between the service entities, and a method for generating a session key etc. The solution is illustrated in brief as follows.

1. Defining an Authentication Mode

An E2E authentication mode can be defined, which is mainly determined by the authentication mechanism of the SS and the EAC and sometimes by the authentication mechanism of the SS and the SP. In the authentication mode, there are several authentication-related modes defined, including the authentication mechanism of the SS and the EAC, the authentication mechanism of the SP and the EAC, the authentication mechanism between the SS and the SP, the mechanism of authentication inquiring, the mechanism for generating the derived key, and the mechanism for generating the session key etc. And in practical applications, only a part of the above authentication-related modes may be defined in the authentication mode with regard to some cases. For example, in case that the SS and the SP can directly authenticate without negotiating the authentication mechanism and establish a security connection, the authentication between the SS and the EAC and that between the SP and the EAC are not necessary. Therefore, in the authentication-related mode for this case, only the authentication mechanism between the SS and the SP and the method for generating the session key should be defined.

In the authentication mode, the choosing policy of each authentication mechanism can be further defined, including whether the authentication mechanism is optional or not and whether the authentication method should be negotiated or not.

There are several types of End-to-End (E2E) authentication mode which can be adopted by the embodiments of the present invention as follows.

E2E_3GPP_AKA, E2E_3GPP2_AKA, E2E_3GPP2_CAVE, E2E_WLAN, E2E_3GPP2_MNAAA, E2E_3GPP_WLAN, E2E_Kerberos, E2E_Mediation, E2E_TLS (however, the definition of the authentication mode is not limited to these types, and new types can also be defined as required). The embodiments of these types of authentication modes are as follows.

1. Definition of E2E_3GPP_AKA is as follows:
E2E_3GPP_AKA ::= struct {
SS<->EAC authentication mechanism AKA
Bearer protocol HTTP Digest
    SP<->EAC authentication mechanism the TLS mechanism (or the IPSec channel mechanism and etc)
        SS<->SP authentication mechanism the basic inquiring mechanism
        Bearer protocol TLS (or others)
        Mechanism for generating the session key self-defined (or others, optional)
}
2. Definition of E2E_3GPP2_CAVE is as follows:
E2E_3GPP2_CAVE ::= struct {
SS<->EAC authentication mechanism Authentication based on CAVE
Bearer protocol HTTP Digest
    SP<->EAC authentication mechanism TLS mechanism (or IPSec channel mechanism and etc)
SS<->SP authentication mechanism basic inquiring mechanism
Bearer protocol TLS (or others)
Mechanism for generating the session key self-defined (or others, optional)
}
3. E2E_WLAN ::= struct {
SS<->EAC authentication mechanism AKA (or SIM)
Bearer protocol EAP(Extensible Authentication Protocol)
SP<->EAC authentication mechanism TLS mechanism (or IPSec channel mechanism and etc)
    SS<->SP authentication mechanism basic inquiring mechanism
Bearer protocol TLS (or others)
    Mechanism for generating the session key self-defined (or others, optional)
}
4. Definition of E2E_Kerberos is as follows:
    SS<->EAC authentication mechanism (negotiable, for example, AKA, CABE-based authentication, certificate-based authentication)
    SP<->EAC authentication mechanism IPSec channel (or others, optional)
SS<->SP authentication mechanism Kerberos (compulsory, it can be negotiated which one of Kerberos and modified Kerberos solutions should be used)
Bearer protocol TCP (or others)
Mechanism for generating the session key TLS-Krb5 (or others, optional)
}
5. Definition of E2E_TLS is as follows:
E2E_TLS ::= struct {
    SS<->EAC authentication mechanism none
     SP<->EAC authentication mechanism none
     SS<->SP authentication mechanism TLS
Mechanism for generating the session key TLS-PSK5 (or others, optional)
}
6. Definition of E2E_3G_GAA is as follows:
The authentication mechanism between the SS and EAC may be any of SIM, AKA, CAVE, MN-AAA Key, TLS-PSK, TLS-Cert etc;
The authentication mechanism between SP and EAC may be TLS, IKE;
The mechanism of authentication inquiring and the mechanism for generating a derived key is GBA; and
The authentication mechanism between the SS and SP may be TLS-PSK, TLS-Cert.
7. Definition of E2E_KERBEROS is as follows:
The authentication mechanism between the SS and EAC may be those defined in E2E_3G_GAA, and the EAC generates the SGT and send to the service entity after authentication;
The authentication mechanism between SP and EAC may be NULL, TLS, IKE;
The mechanism of authentication inquiring and the mechanism for generating a derived key is Kerberos; and
The authentication mechanism between the SS and SP may be NULL, TLS-KBR5.
8. Definition of E2E_Mediation is as follows:
The authentication mechanism between the SS and EAC may be IKE, besides those defined in E2E_3G_GAA;
The authentication mechanism between SP and EAC may be those defined in E2E_3G_GAA;
The mechanism of authentication inquiring and the mechanism for generating a derived key is Mediation; and
The authentication mechanism between the SS and SP is TLS-PSK.
9. Definition of E2E_TLS is as follows:

-continued

The authentication mechanism between the SS and EAC is NULL;
The authentication mechanism between SP and EAC is NULL;
The mechanism of authentication inquiring and the mechanism for generating a derived key is NULL; and
The authentication mechanism between the SS and SP may be TLS-Cert, TLS-PSK.

In the above modes, new authentication modes can be defined according to service requirements. The embodiments of the present invention do not limit the specific authentication-related modes defined in the authentication mode, such as the authentication mechanism, selection policy, and mechanism for generating the key etc.

Figure 15:
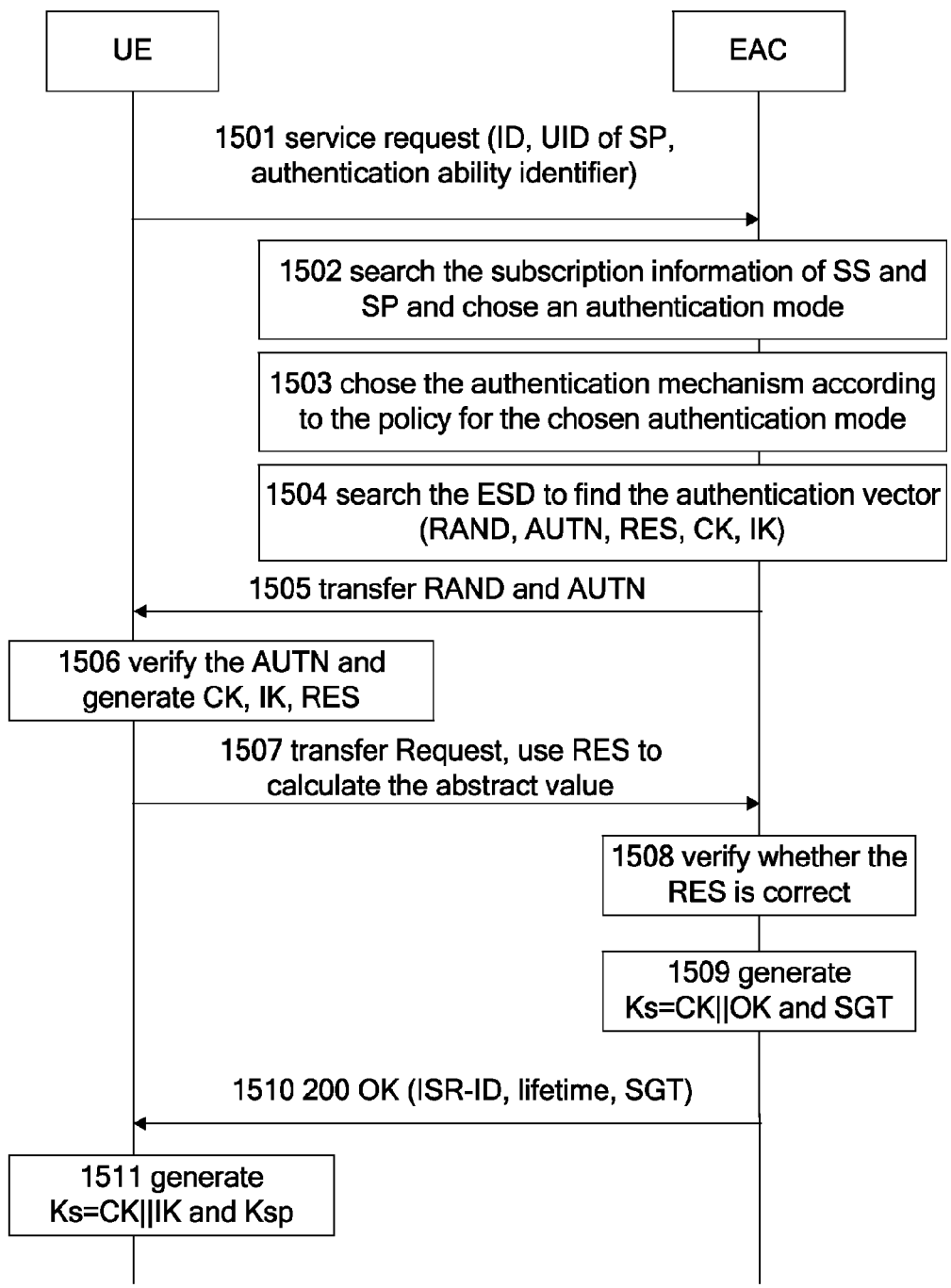
FIG. 15 is a flow chart illustrating the process of authentication between a service subscriber and an entity authentication centre in an embodiment according to the present invention.

FIG. 15 is a flow chart illustrating the of authentication procedure between a service subscriber and an EAC in an embodiment of the present invention. Referring to FIG. 15, in this embodiment, a UE of a mobile subscriber in the 3GPP network uses a service provided by an application server in the Internet (the server supports the Kerberos authentication protocol). The detailed procedure is as follows.

Block 1501: the SS (i.e., the UE) transfers to the EAC a service request carrying the UE's ID, an authentication capability identifier, a service type, and the service request may not carry the service type but the UID of the SP to enable the EAC to search the corresponding service type from the Entity Subscription Database (ESC) through the UID.

Block 1502: the EAC selects an authentication mode and the corresponding authentication mechanism by adopting the local policy according to the ID in the service request, the information of the authentication capabilities of the SS and SP. In this embodiment, the authentication mode selected is assumed as the E2E_Kerberos mode.

The EAC is capable of deciding each authentication mechanism according to the local policy and the selecting policy in the authentication mode. The local policy can be that the SS and the SP select the mutual authentication mechanism and the mechanism for generating the session key according to the authentication capabilities of the two parties and the service type, and whether to perform the mutual authentication between the SP and the EAC can be decided by the mutual authentication mechanism of the SS and the SP. If it is needed to perform the mutual authentication, an authentication mechanism would be selected according to the authentication capabilities of the SP and the EAC and the service type etc.

Block 1503: according to the definition of the E2E_Kerberos mode, the authentication mechanism of the SS and the EAC is negotiable, therefore the authentication mechanism can be selected according to the local policy (that is, the authentication capabilities of the two parties, the type of the service to be used by the two parties, and etc.). In this embodiment, the authentication mechanism of the SS and the EAC is assumed as the AKA authentication mechanism. The authentication mechanism of the SS and the EAC may be the IPSec channel or others and is optional. In this embodiment, it is assumed that the authentication mechanism of the SS and the EAC is configured as null, that is, the authentication between the SP and the EAC will not be performed. The authentication mechanism of the SS and the SP is set as Kerberos, so the authentication mechanism of the SS and the SP can be negotiated by deciding whether to use the Kerberos or the modified Kerberos solution, and the bearer protocol can be TCP or other by negotiation. In this embodiment, according to the authentication capabilities of the two parties, the service type and etc., via negotiation, the Kerberos is selected as the authentication mechanism of the SS and the SP and the TLS-Krb5 is selected as the bearer protocol. The mechanism for generating the session key is set as TLS-Krb5 or others and optional, and in this embodiment, the TLS-Krb5 is selected as the mechanism for generating the session key.

According to the above-selected various authentication modes, the authentication between the SS and the EAC can be started. If the SS and the EAC have performed AKA mutual authentication and the generated shared key and ISR-ID are sill in the lifetime, the AKA mutual authentication needn't to be performed, and it is to perform Block 209 directly to generate an SGT.

Block 1504: the EAC acquires the subscriber's authentication vector (RAND, AUTN, RES, CK, IK) from the ESD.

Block 1505: the EAC transfers to the UE an HTTP 401 message (including a gest AKA challenge) carrying the RAND and AUTN, and carries the authentication mechanism identifier a in the payload information of the message.

Block 1506: the UE calculates and verifies the validity of the received AUTN to confirm whether the changeling message comes from an authorized network, and calculates the CK, IK, and RES.

Block 1507: the UE transfers to the EAC an HTTP request message including a Digest AKA response and an abstract value calculated by using the RES.

Block 1508: the EAC verifies the accuracy of the calculated abstract value to authenticate the validity of the UE.

Block 1509: the EAC generates a shared key, Ks=CK∥IK, and the ISR-ID, and then uses the shared key, Ks, the ID of the SS and the UID of the SP to generate a derived key, Ksp, and carries the generated derived key in the SGT, the contents of which include the Ksp, the ISR-ID of the SS, the UID of the SP, the lifetime, parameters of avoiding replay attack, and etc, wherein the SGT is enciphered by the shared key of the EAC and SP.

Block 1510: the EAC transfers to the UE a 200 OK message to identify the successful end of the authentication, including the lifetime of the shared key, the ISR-ID, and the SGT enciphered by using the Ks.

Block 1511: the UE also generates the shared key, Ks=CK∥IK, and the derived key, Ksp, and then acquires the ISR-ID in the 200 OK message by decrypting, associates such information acquired by decrypting with the authentication mode information, and stores the associated information in local.

Figure 16:
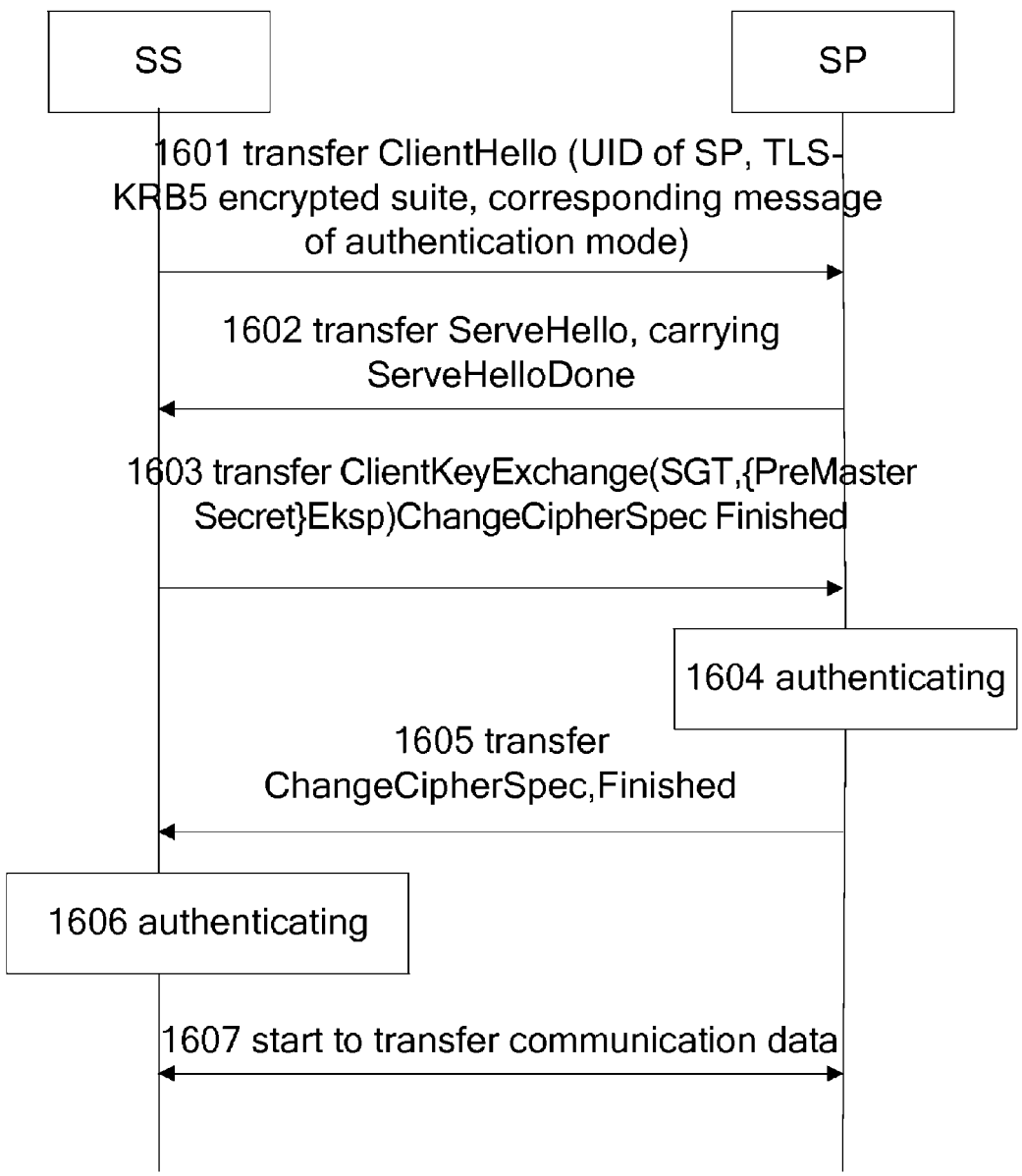
FIG. 16 is a flow chart illustrating the process of mutual authentication between a service subscriber and a service provider in an embodiment according to the present invention.

FIG. 16 is a flow chart illustrating the process of mutual authentication between a SS and a SP of in an embodiment according to the present invention. Referring to FIG. 16, the detailed procedure for of the mutual authentication between the SS and the SP is as follows.

Block 1601: the SS transfers to the SP a ClientHello message carrying the UID of the SP, the TLS-KRB5 encipher suite supported by the SS, and the related information of the authentication mode of E2E_Kerberos.

The related information of the authentication mode of E2E_Kerberos refers to the modes defined, including the authentication mechanism between the SS and the SP and the mechanism for generating the session key.

Block 1602: upon receiving the Client Hello message, the SP finds that the Session ID field is null, then selects the TLS-KRB5 encipher suite supported by the two parties, and transfers to the SS a ServerRequest message, a ServerHello and a ServerHelloDone message.

Block 1603: upon receiving the ServiceHelloDone message, the SS transfers to the SP a ClientKeyExchange message by which the two parties acquire the pre-shared secrete parameters (PreMasterSecret). The SS uses the PreMasterSecret and a random number to generate a session key (MasterSecret). Then the SS transfers a ChangeCipherSpec message to the SP and transfers a Finished message subsequently to the SP for the formal key exchange and validation.

Block 1604: the SP decrypts an SGT, checks the validation of the SGT, acquires the shared derived key, Ksp, uses the shared derived key, Ksp, to decrypt the PreMasterSecret, and generates the session key of the SS and the SP, MasterSecret, according to the PreMasterSecret and a random number. And then, the SP verifies whether the information in the Finished message from the SS is correct. If the information is not correct, it terminates the current procedure; otherwise, it performs Block 1605.

Block 1605: the SP transfers a ChangeCipherSpec message to the SS and transfers a Finished message to the SS later.

Block 1606: the SS verifies whether the information in the Finished message from the SP is correct. If the SS decides that information in the Finished message from the SP is correct, it means that the authentication and key exchange procedure between the two parties has successfully ended.

Block 1607: the SS and the SP start to transfer service communication data.

When the session established in the above procedure has not been overdue, if the SS transfers a service request to the SP again, the PreMasterSecret generated in the last session can be re-used to generate a new session key (MasterSecret) for this service communication.

Figure 17:
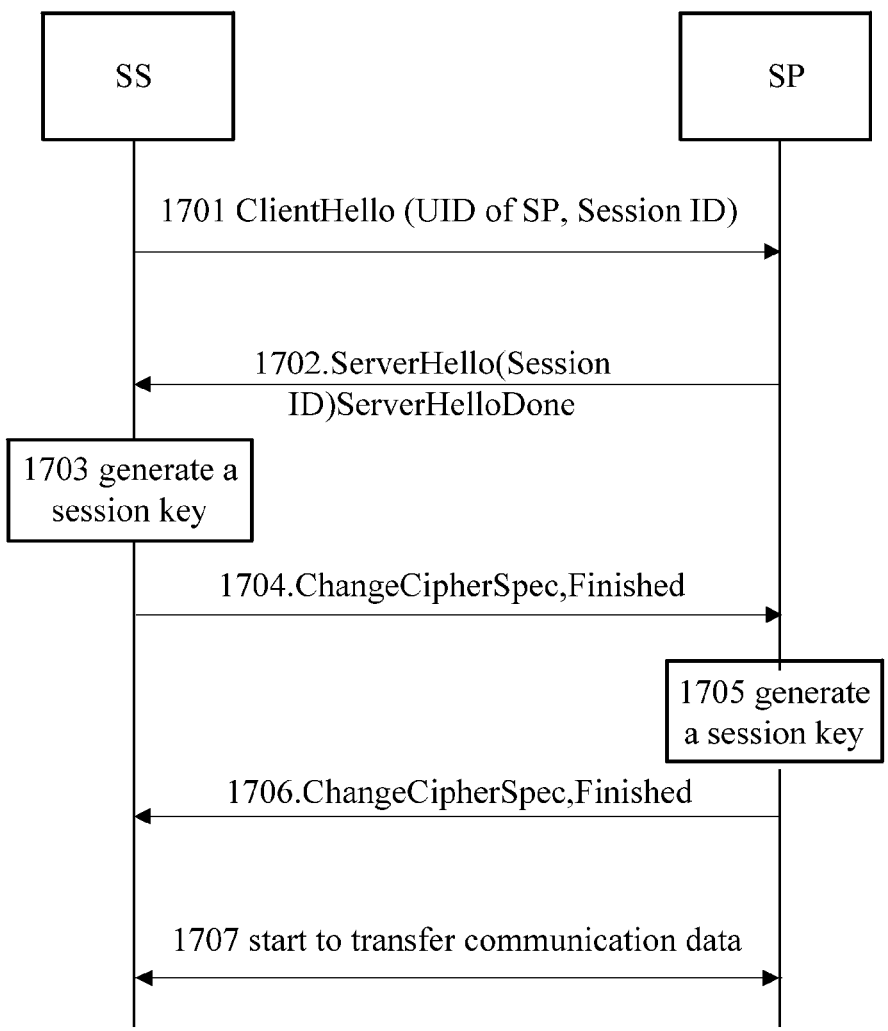
FIG. 17 is a flow chart illustrating the process of a service subscriber and a service provider reusing the authentication result to generate a session key in an embodiment according to the present invention.

FIG. 17 is a flow chart illustrating the process of an SS and SP reusing the authentication result to generate a session key in an embodiment according to the present invention. Referring to FIG. 17, the detailed procedure is as follows.

Block 1701: the SS transfers to the SP a Client Hello message carrying the Session ID of the last session occurring last time.

Block 1702: upon receiving the Client Hello message, the SP finds that the Session ID in the message is not set as null and is capable of matching the security connection information associated with the session ID, therefore the Session ID is re-used to identify this session. Moreover, the SP transfers to the SS a ServerHello message carrying the Session ID and then transfers a ServerHelloDone message to the SS.

Block 1703: the SS uses the PreMasterSecret shared with the SP to generate a session key (MasterSecret).

Block 1704: the SS transfers a ChangeCipherSpec message to the SP and transfers a Finished message to the SP later.

Block 1705: after deciding that the received Finished message is correct, the SP uses the same PreMasterSecret to generate the session key (MasterSecret).

Block 1706: the SP transfers a ChangeCipherSpec message to the SS and transfers a Finished message to the SS subsequently.

Block 1707: if deciding that the Finished message received by the SS is correct, the mutual authentication between the two parties is terminated and the service communication data is started to be transferred.

Figure 18:
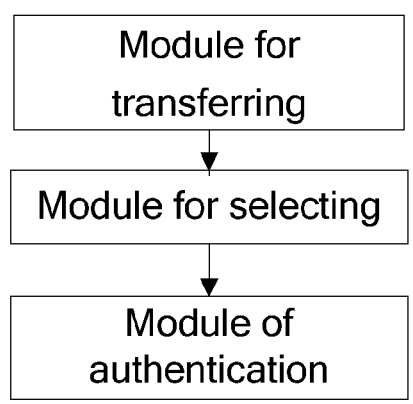
FIG. 18 is a schematic diagram illustrating the structure of an embodiment of an end-to-end communication authentication apparatus according to the present invention.

According to the enhanced entity authentication solution based on the authentication mode, another apparatus of entity authentication is provided by an embodiment according to the present invention. The apparatus is similar to the apparatus shown in FIG. 14. FIG. 18 is a schematic diagram illustrating an embodiment of end-to-end communication authentication apparatus according to the present invention. Referring to FIG. 18, the apparatus of entity authentication includes a module for transferring (similar as the module for transferring the authentication request as shown in FIG. 14), configured to transfer an authentication request to the EAC, a module for selecting (similar as the module of negotiation shown in FIG. 14), configured to select an authentication mode according to the authentication request transferred by the module for transferring and informing the service entity, and a module of authentication, configured to perform authentication between the service entity and the EAC or that between the service entities according to the authentication mechanism selected by the module for selecting. The principles for implementing the specific functions of these modules have been described in the above-mentioned procedures, so no more descriptions will be given for it herein.

Of course, another apparatus of entity authentication can be provided by the embodiment according to the present invention, which is capable of realizing the functions of the above two apparatus. This apparatus may include, a first module, used for performing the functions of the abovementioned module for transferring and that for transferring the authentication request, a second module, used for performing the functions of the module for selecting and the module of negotiation, and a third module, used for performing the functions of the module of authentication and module of authentication interaction. No more description about the apparatus will be given hereinafter.

The foregoing description is only the embodiments of the present invention and is not for use in limiting the protection scope thereof. All the modifications, equivalent replacements or improvements in the scope of the spirit and principles of the present invention shall be included in the protection scope of the appended claims.

What is claimed is:

1. A method of authentication inquiring, wherein the method is applied to a system comprising a first service entity requesting a service, a second service entity providing the service and an Entity Authentication Centre (EAC), wherein, a mutual authentication between the first service entity and the EAC and that between the second service entity and the EAC are respectively performed, the EAC allocates an Interim Service Request Identifier (ISR-ID) to the first service entity and an Interim Authentication Check Identifier (IAC-ID) to the second service entity and acquires the shared key materials respectively for protecting the communications with the first service entity and the second service entity; the method comprising:

issuing, by the first service entity, a service request to the second service entity, the service request includes the ISR-ID acquired by the first service entity in the authentication with the EAC;

wherein the service request is used for the second service entity, upon receiving the service request, to search whether there is the ISR-ID of the first service entity stored locally to identify the first service entity, if not, the second service entity sends an authentication inquiring request to the EAC and carries the ISR-ID of the first service entity and the IAC-ID of the second service entity;

generating, by the EAC upon receiving the authentication inquiring request, a derived key for the first service entity and the second service entity when it is decided that the IAC-ID is valid and the second service entity is entitled to provide the service besides the ISR-ID is valid and the first service entity is entitled to request the service;

returning, by the EAC, to the second service entity an authentication inquiring response which carries the derived key which is acquired by enciphering the shared key material of the second entity and the EAC;

wherein the authentication inquiring response is used for the second service entity to acquire the derived key from the authentication inquiring response by decrypting and to return a service request response to the first service entity, and the service request response is used for the first service entity to calculate the same derived key by using an algorithm and parameters used by the EAC;

wherein the service request which is issued from the first service entity to the second service entity further includes a public identity (UID) of the second service entity for contacting with other service entities; and the authentication inquiring request which is sent from the second service entity to the EAC further carries the UID besides the ISR-ID of the first service entity and the IAC-ID of the second service entity.

2. The method according to claim 1, wherein the authentication inquiring response further carries a lifetime of the key; the method further comprising:

associating, by the second service entity, the derived key, the lifetime, the ISR-ID of the first service entity and the UID of the second service entity and stores them locally besides acquiring the derived key from the authentication inquiring response by decrypting.

3. A system for authenticating inquiring, wherein the system comprises:

a first service entity requesting a service, a second service entity providing the service and an EAC, wherein, a mutual authentication between the first service entity and the Entity Authentication Centre (EAC) and that between the second service entity and the EAC are respectively performed, the EAC allocates an Interim Service Request Identifier (ISR-ID) to the first service entity and an Interim Authentication Check Identifier (IAC-ID) to the second service entity and acquires the shared key materials respectively for protecting the communications with the first service entity and the second service entity;

the first service entity is configured to issue a service request to the second service entity, the service request includes the ISR-ID acquired by the first service entity in the authentication with the EAC;

the second service entity is configured to search whether there is the ISR-ID of the first service entity stored locally to identify the first service entity upon receiving the service request, if not, the second service entity sends an authentication inquiring request to the EAC and carries the ISR-ID of the first service entity and the IAC-ID of the second service entity;

the EAC is configured to generate a derived key for the first service entity and the second service entity when it is decided that the IAC-ID is valid and the second service entity is entitled to provide the service besides the ISR-ID is valid and the first service entity is entitled to request the service upon receiving the authentication inquiring request;

the EAC is further configured to return to the second service entity an authentication inquiring response which carries the derived key which is acquired by enciphering the shared key material of the second entity and the EAC;

the second service entity is further configured to acquire the derived key from the authentication inquiring response by decrypting;

the second service entity is further configured to return a service request response to the first service entity;

the first service entity is further configured to calculate the same derived key by using parameters and an algorithm used by the EAC;

wherein the service request which is issued from the first service entity to the second service entity further includes a public identity (UID) of the second service entity for contacting with other service entities; and the authentication inquiring request which is sent from the second service entity to the EAC further carries the UID besides the ISR-ID of the first service entity and the IAC-ID of the second service entity.

4. The system according to claim 3, wherein the authentication inquiring response further carries a lifetime of the key;

the second service entity is further configured to associate the derived key, the lifetime, the ISR-ID of the first service entity and the UID of the second service entity and stores them locally besides acquiring the derived key from the authentication inquiring response by decrypting.

* * * * *